US009088707B2

(12) United States Patent  (10) Patent No.: US 9,088,707 B2
Sasaki  (45) Date of Patent: Jul. 21, 2015

(54) FOCUS CONTROL DEVICE, ENDOSCOPE APPARATUS, AND FOCUS CONTROL METHOD

(71) Applicant: OLYMPUS CORPORATION, Tokyo (JP)

(72) Inventor: Hiroshi Sasaki, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 336 days.

(21) Appl. No.: 13/644,378

(22) Filed: Oct. 4, 2012

(65) Prior Publication Data

US 2013/0083180 A1 Apr. 4, 2013

(30) Foreign Application Priority Data

Oct. 4, 2011 (JP) .................................. 2011-220092

(51) Int. Cl.
*H04N 7/18* (2006.01)
*H04N 5/232* (2006.01)
*B41J 2/16* (2006.01)

(52) U.S. Cl.
CPC ............. *H04N 5/23212* (2013.01); *B41J 2/161* (2013.01); *B41J 2/1623* (2013.01)

(58) Field of Classification Search
CPC .... B41J 2/161; B41J 2/1623; H04N 5/23212; H04N 2005/2255; H04N 7/183; A61B 1/05; A61B 1/042; A61B 1/045; A61B 1/00193; G02B 21/27025; G02B 21/27027
USPC .......................................................... 348/65
See application file for complete search history.

(56) References Cited

U.S. PATENT DOCUMENTS

| 3,357,433 | A | * | 12/1967 | Fourestier et al. ............ 600/129 |
| 4,311,904 | A | * | 1/1982 | Okada et al. .................. 250/204 |
| 5,027,147 | A | * | 6/1991 | Kaneda ............................ 396/81 |
| 5,475,420 | A | * | 12/1995 | Buchin ........................... 348/72 |
| 5,589,874 | A | * | 12/1996 | Buchin ........................... 348/72 |
| 5,710,662 | A | * | 1/1998 | Nishida ......................... 359/368 |
| 5,836,869 | A | * | 11/1998 | Kudo et al. .................... 600/173 |
| 6,036,637 | A | * | 3/2000 | Kudo ............................ 600/173 |
| 6,533,721 | B1 | * | 3/2003 | Beutter et al. ................. 600/167 |
| 7,537,561 | B2 | * | 5/2009 | Yamaya et al. ................ 600/106 |
| 7,553,276 | B2 | * | 6/2009 | Iddan ............................ 600/160 |
| 7,910,868 | B2 | * | 3/2011 | Suzuki et al. .............. 250/201.2 |
| 8,444,548 | B2 | * | 5/2013 | Kumei .......................... 600/109 |
| 8,542,272 | B2 | * | 9/2013 | Takei et al. ..................... 348/65 |

(Continued)

FOREIGN PATENT DOCUMENTS

JP 2-304413 A 12/1990
JP 2011139760 A * 7/2011 ............... A61B 1/00

*Primary Examiner* — Shan Elahi
(74) *Attorney, Agent, or Firm* — Holtz, Holtz, Goodman & Chick PC

(57) ABSTRACT

A focus control device includes an image acquisition section that acquires a captured image that has been captured by an imaging optical system, an evaluation value calculation section that calculates a focus evaluation value based on the captured image, the focus evaluation value being used to evaluate an in-focus state of an object in the captured image, a determination information calculation section that calculates determination information based on the focus evaluation value, a determination section that determines whether to start or stop an autofocus control process based on the determination information, and a focus control section that starts or stops the autofocus control process based on a determination result of the determination section.

25 Claims, 14 Drawing Sheets

(56) References Cited

U.S. PATENT DOCUMENTS

| | | | |
|---|---|---|---|
| 8,773,765 B2* | 7/2014 | Sasamoto | 359/684 |
| 8,861,949 B2* | 10/2014 | Ishibashi et al. | 396/125 |
| 2002/0055669 A1* | 5/2002 | Konno | 600/167 |
| 2003/0040659 A1* | 2/2003 | Kazakevich | 600/167 |
| 2005/0004474 A1* | 1/2005 | Iddan | 600/476 |
| 2006/0120709 A1* | 6/2006 | Kobayashi | 396/80 |
| 2007/0010711 A1* | 1/2007 | Hasegawa | 600/168 |
| 2007/0098390 A1* | 5/2007 | Sasaki | 396/147 |
| 2007/0273783 A1* | 11/2007 | Okazaki et al. | 348/345 |
| 2007/0293725 A1* | 12/2007 | Hasegawa | 600/168 |
| 2008/0218598 A1* | 9/2008 | Harada et al. | 348/222.1 |
| 2009/0046196 A1* | 2/2009 | Lavrentiev et al. | 348/345 |
| 2009/0289200 A1* | 11/2009 | Ishii | 250/459.1 |
| 2011/0164868 A1* | 7/2011 | Hamada | 396/123 |

* cited by examiner

FOCUS CONTROL DEVICE, ENDOSCOPE APPARATUS, AND FOCUS CONTROL METHOD

Japanese Patent Application No. 2011-220092 filed on Oct. 4, 2011, is hereby incorporated by reference in its entirety.

BACKGROUND

The present invention relates to a focus control device, an endoscope apparatus, a focus control method, and the like.

An improvement in detection accuracy of a lesion in a body cavity has been desired in the field of endoscopic diagnosis. An endoscope that includes a magnifying optical system that improves the detection accuracy by magnifying the difference in tissue between a lesion area and a normal area at a magnification almost equal to that of a microscope (hereinafter may be appropriately referred to as "magnifying endoscope") has been known.

A magnifying endoscope may achieve a magnification of several ten to several hundred times. The microstructure of a mucous membrane surface layer and a blood vessel distribution pattern can be observed by utilizing such a magnifying endoscope in combination with a stain solution or a blood vessel-enhanced (weighted) image (NBI image) obtained using narrow-band illumination light. It is known that a lesion area and a normal area differ in the above pattern, and the above pattern has been used as a criterion of lesion diagnosis.

JP-A-2-304413 discloses an endoscope that implements an autofocus control process, and allows the user to start or stop the autofocus process using a switch provided in an operation section of the endoscope.

SUMMARY

According to one aspect of the invention, there is provided a focus control device comprising:

an image acquisition section that acquires a captured image that has been captured by an imaging optical system;

an evaluation value calculation section that calculates a focus evaluation value based on the captured image, the focus evaluation value being used to evaluate an in-focus state of an object in the captured image;

a determination information calculation section that calculates determination information based on the focus evaluation value;

a determination section that determines whether to start or stop an autofocus control process based on the determination information; and a focus control section that starts or stops the autofocus control process based on a determination result of the determination section.

According to another aspect of the invention, there is provided a focus control device comprising:

an image acquisition section that acquires a captured image that has been captured by an imaging optical system;

an evaluation value calculation section that calculates a focus evaluation value based on the captured image, the focus evaluation value being used to evaluate an in-focus state of an object in the captured image;

a determination information calculation section that calculates determination information based on the focus evaluation value;

a determination section that determines whether or not to switch a focus control process between a fixed-focus control process and an autofocus control process based on the determination information, the fixed-focus control process setting an in-focus object plane of the imaging optical system at a preset in-focus object plane; and a focus control section that switches the focus control process between the fixed-focus control process and the autofocus control process based on a determination result of the determination section.

According to another aspect of the invention, there is provided an endoscope apparatus comprising:

an imaging optical system; and one of the above focus control devices.

According to another aspect of the invention, there is provided a focus control method comprising:

acquiring a captured image that has been captured by an imaging optical system;

calculating a focus evaluation value based on the captured image, the focus evaluation value being used to evaluate an in-focus state of an object in the captured image;

calculating determination information based on the focus evaluation value;

determining whether to start or stop an autofocus control process based on the determination information; and starting or stopping the autofocus control process based on a result of the determination.

According to another aspect of the invention, there is provided a focus control method comprising:

acquiring a captured image captured by an imaging optical system;

calculating a focus evaluation value based on the captured image, the focus evaluation value being used to evaluate an in-focus state of an object in the captured image;

calculating determination information based on the focus evaluation value;

determining whether or not to switch a focus control process between a fixed-focus control process and an autofocus control process based on the determination information, the fixed-focus control process setting an in-focus object plane of the imaging optical system at a preset in-focus object plane; and switching the focus control process between the fixed-focus control process and the autofocus control process based on a result of the determination.

DESCRIPTION OF EXEMPLARY EMBODIMENTS

Figure 1:
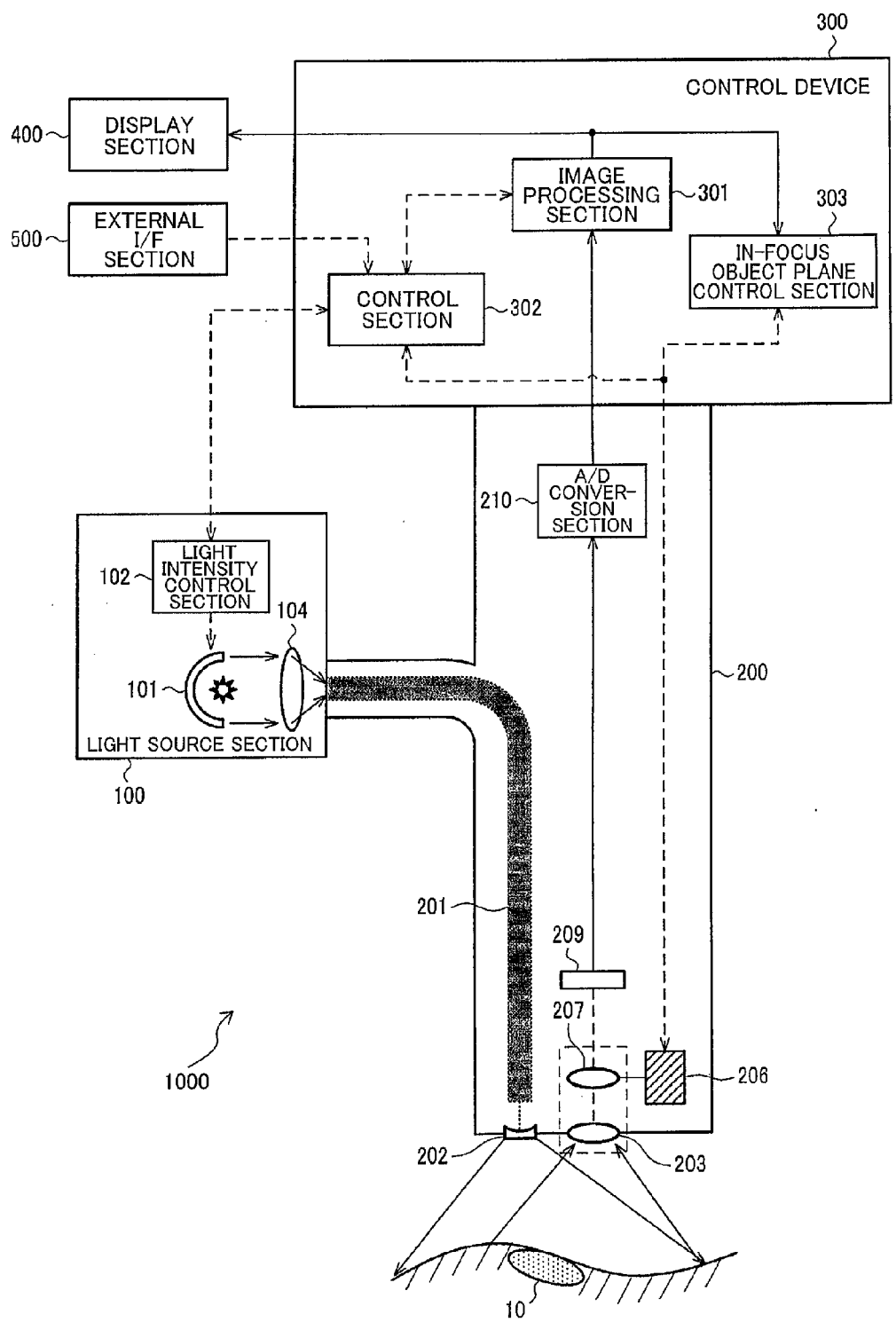
FIG. 1 illustrates a configuration example of an endoscope apparatus according to a first embodiment.

According to one embodiment of the invention, there is provided a focus control device comprising:

an image acquisition section that acquires a captured image that has been captured by an imaging optical system;

an evaluation value calculation section that calculates a focus evaluation value based on the captured image, the focus evaluation value being used to evaluate an in-focus state of an object in the captured image;

a determination information calculation section that calculates determination information based on the focus evaluation value;

a determination section that determines whether to start or stop an autofocus control process based on the determination information; and a focus control section that starts or stops the autofocus control process based on a determination result of the determination section.

According to this aspect of the invention, whether to start or stop the autofocus control process is determined based on the determination information that is calculated based on the focus evaluation value. The autofocus control process is started or stopped based on the determination result. This makes it possible to automatically start the autofocus control process in the zoom observation state, for example.

According to another embodiment of the invention, there is provided a focus control device comprising:

an image acquisition section that acquires a captured image that has been captured by an imaging optical system;

an evaluation value calculation section that calculates a focus evaluation value based on the captured image, the focus evaluation value being used to evaluate an in-focus state of an object in the captured image;

a determination information calculation section that calculates determination information based on the focus evaluation value;

a determination section that determines whether or not to switch a focus control process between a fixed-focus control process and an autofocus control process based on the determination information, the fixed-focus control process setting an in-focus object plane of the imaging optical system at a preset in-focus object plane; and a focus control section that switches the focus control process between the fixed-focus control process and the autofocus control process based on a determination result of the determination section.

According to this aspect of the invention, whether or not to switch the focus control process between the fixed-focus control process and the autofocus control process is determined based on the determination information that is calculated based on the focus evaluation value. The focus control process is switched between the fixed-focus control process and the autofocus control process based on the determination result. This makes it possible to automatically switch the focus control process from the fixed-focus control process to the autofocus control process, and start the autofocus control process in the zoom observation state, for example.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. Outline

An outline of several embodiments of the invention is described below. When performing zoom observation using a magnifying endoscope, skill is required to continuously obtain (observe) an in-focus image. Therefore, it may take time to position the scope in order to obtain an in-focus image, so that the diagnosis time may increase. This may increase the burden imposed on the doctor and the patient.

JP-A-2-304413 discloses a method that allows the user to start or stop (enable or disable) the autofocus process using a switch. It is unnecessary to perform the autofocus control process when performing screening observation using an endoscope since the imaging system is designed so that the object is in focus over the entire field of view. On the other hand, it is effective to allow the user to select whether or not to use the autofocus control process during zoom observation.

Specifically, it is necessary to adjust the relative positions of the end of the scope and the object by moving the scope (insertion/removal and angular adjustment) while turning a zoom lever provided in the operation section of the scope so that the magnification increases. When adjusting the relative positions of the end of the scope and the object, it is necessary to perform a framing operation while manually adjusting the relative distance between the object and the scope within a narrow depth of field. Since such an operation is considerably difficult, it is effective to utilize the autofocus control process during zoom observation.

When using the method disclosed in JP-A-2-304413, however, the user must start or stop the autofocus control process by operating a switch. This is inconvenient to the user.

According to several embodiments of the invention, the autofocus control process is automatically started when it has been determined that the observation state is a zoom observation state, without requiring the user to start or stop the autofocus control process. More specifically, the autofocus control process is performed when a change in contrast has exceeded a threshold value (see FIG. 5) by utilizing the fact that a change in contrast of an image increases during zoom observation (see FIG. 4A).

2. First embodiment 2.1. Endoscope Apparatus

A first embodiment of the invention is described below. FIG. 1 illustrates a configuration example of an endoscope apparatus 1000 according to the first embodiment. The endoscope system (apparatus) 1000 includes a light source section 100, an imaging section 200, a control device (processor section) 300, a display section 400, and an external I/F section 500.

The light source section 100 includes a white light source 101, a light intensity control section 102, and a condenser lens 104 that focuses illumination light emitted from the white light source 101 on the input end face of a light guide fiber 201.

The imaging section 200 is formed to be elongated and flexible (i.e., can be curved) so that the imaging section 200 can be inserted into a body cavity or the like. The imaging section 200 includes the light guide fiber 201 that guides the light focused by the light source section 100, and an illumination lens 202 that diffuses the light guided by the light guide fiber 201 to illuminate an object. The imaging section 200 also includes an objective lens 203 that focuses reflected light from the object, a zoom lens driver section 206, and a zoom lens 207 for adjusting the zoom magnification. The imaging section 200 also includes an image sensor 209 that detects the focused light, and an A/D conversion section 210 that converts analog signals photoelectrically converted by the image sensor 209 into digital signals. Note that the image sensor 209 is a single-chip image sensor in which primary-color or complementary-color color filters are disposed in respective pixels in a given array (e.g., Bayer array). For example, a CCD image sensor, a CMOS image sensor, or the like may be used as the image sensor 209.

The control device 300 includes an image processing section 301, a control section 302, and an in-focus object plane control section 303.

The image processing section 301 performs image processing such as a white balance process and a grayscale transformation process. The control section 302 controls each section of the endoscope apparatus. The in-focus object plane control section 303 performs a fixed-focus control process, an autofocus control process, and a switch control process that switches the focus control process between the fixed-focus control process and the autofocus control process. The details of the in-focus object plane control section 303 are described later.

The display section 400 is a display device (e.g., CRT or liquid crystal monitor) that can display a moving image.

The external I/F section 500 is an interface that allows the user to input information to the endoscope apparatus, for example. The external I/F section 500 includes a power switch (power ON/OFF switch), a mode (e.g., imaging mode) switch knob, and the like. The external I/F section 500 outputs the input information to the control section 302.

2.2. Switch Control Method

The switch control process that switches the focus control process between the fixed-focus control process and the autofocus control process is described in detail below. The observation mode of the endoscope apparatus is described below.

Figure 2:
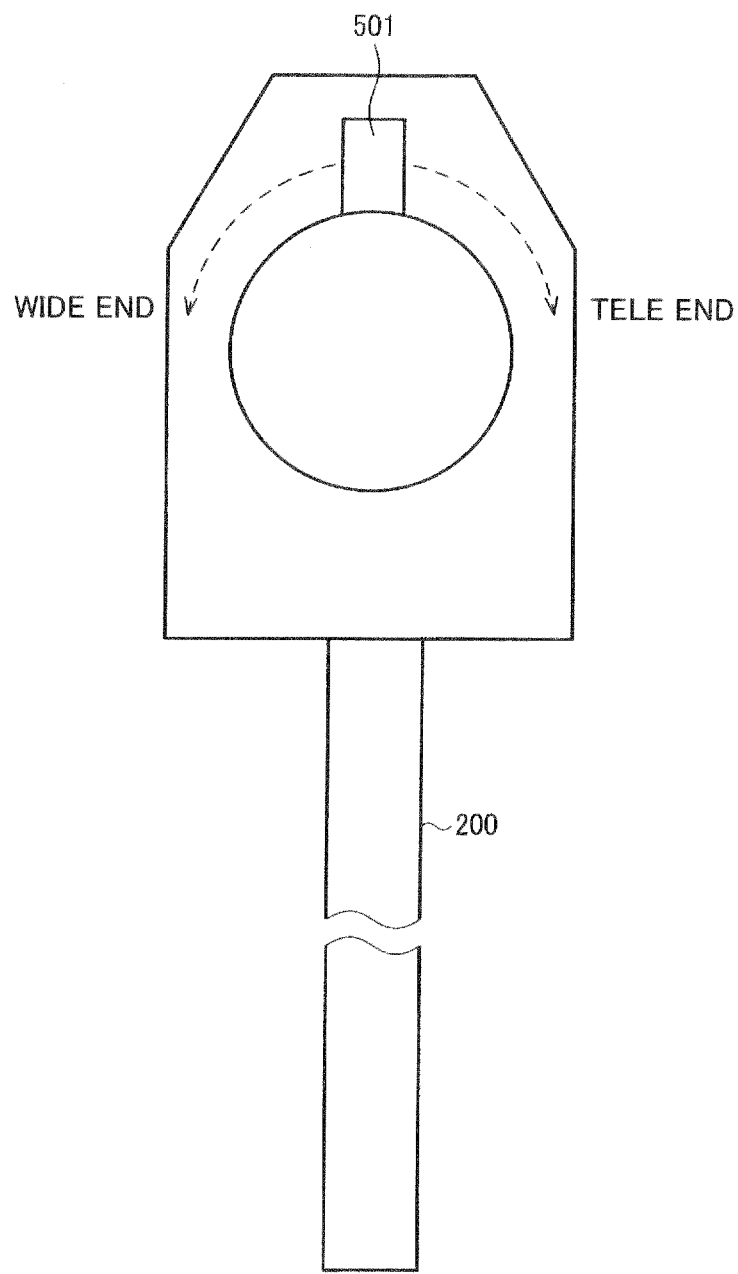
FIG. 2 illustrates a configuration example of a zoom lever.

FIG. 2 illustrates a configuration example of a zoom lever (i.e., mode switch knob). When a zoom lever 501 illustrated in FIG. 2 is turned to the TELE end, the zoom lens moves to achieve a higher magnification, as described later with reference to FIG. 7. For example, when using an optical system that drives only a zoom lens, the object is in focus in a state in which the end of the scope is positioned close to the object when the zoom lens moves to achieve a higher magnification. When the zoom lever 501 is turned to the WIDE end, the zoom lens moves to achieve a lower magnification, and the object is in focus in a state in which the end of the scope is positioned at a distance away from to the object.

The endoscope apparatus 1000 according to the first embodiment utilizes two observation states (observation modes) that differ in observation magnification. In a normal observation state, screening observation is mainly performed (i.e., the object is observed using a deep-focus wide-field image). In a zoom observation state, the mucosal membrane structure, the blood vessel distribution, and the like in a lesion area 10 found by screening observation are magnified to determine whether or not the lesion area 10 is malignant.

The observation state is automatically switched between the normal observation state and the zoom observation state when the user has operated the zoom lever 501 illustrated in FIG. 2. The zoom lever 501 is set to the WIDE end during screening observation. The zoom magnification can be changed stepwise by turning the zoom lever 501 to the TELE end when performing zoom observation.

Figure 3:
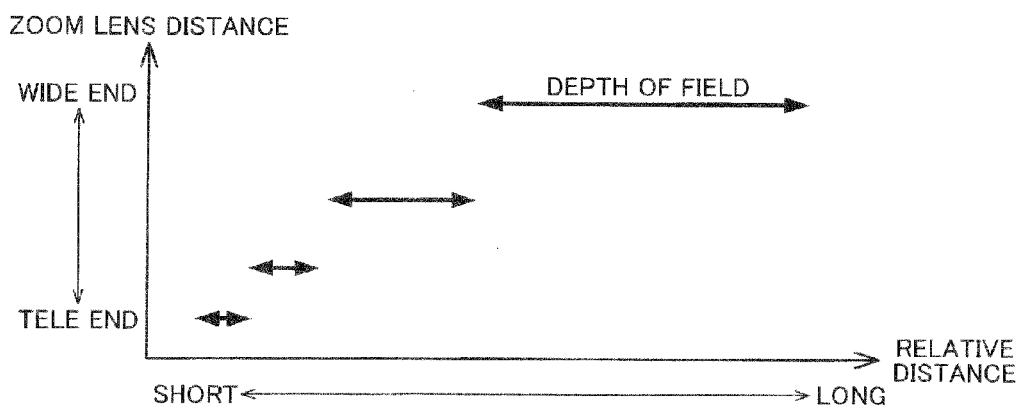
FIG. 3 is a view illustrating a change in depth of field of an imaging optical system when a zoom lever is operated.

A change in depth of field of an imaging optical system that occurs when the zoom lever 501 is operated is described below with reference to FIG. 3. The imaging optical system refers to an optical system that includes the objective lens 203, the zoom lens 207, and the image sensor 209 illustrated in FIG. 1, for example.

The imaging optical system is designed so that the depth of field is a maximum at the WIDE end (see FIG. 3), and the relative distance between the object and the scope during screening observation is within the depth of field. The depth of field decreases when the zoom lever 501 is turned stepwise (e.g., five stages) to the TELE end, but the object can be observed more closely (i.e., high-magnification zoom observation can be performed). The depth of field is very narrow at the TELE end, and the object easily becomes out of focus due to the motion (e.g., pulsation) of the tissue (i.e., object).

Whether zoom observation or screening observation is performed can be determined from the image to a certain extent by positively utilizing the difference in depth of field corresponding to the operation performed on the zoom lever. The details thereof are described below.

Figure 4A:
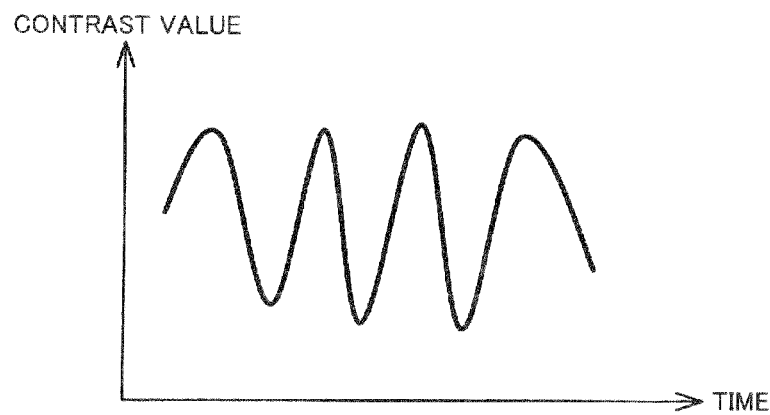
FIG. 4A illustrates an example of the temporal change characteristics of the contrast value of a captured image during zoom observation.

FIG. 4A schematically illustrates an example of the temporal change characteristics of the contrast value of the captured image during zoom observation. It is considered that the user operates the scope during zoom observation in order to maintain the in-focus state. In this case, it is probable that the relative distance between the end of the scope and the object (tissue) changes beyond the depth of field due to pulsation of the tissue and the like. Therefore, the in-focus state and the non-focus state repeatedly occur in the captured image. Specifically, a large change in contrast is detected in the captured image.

Figure 4B:
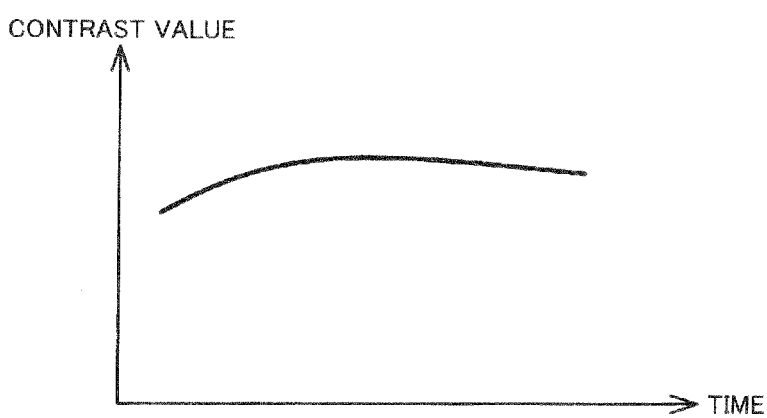
FIG. 4B illustrates an example of the temporal change characteristics of the contrast value of a captured image during screening observation.

FIG. 4B schematically illustrates an example of the temporal change characteristics of the contrast value of the captured image during screening observation. It is probable that the in-focus state is maintained during screening observation in spite of pulsation of the tissue or the operation of the scope since the depth of field is wide. The image may be blurred when the scope is moved at a high speed. In this case, however, the in-focus state and the non-focus state do not occur repeatedly. The image may be blurred due to a local change in contrast depending on the capture target area of the object. Specifically, a local change in contrast may occur due to the presence or absence of folds of the tissue (object), or a dark deep area and a bright front area of a tubular cavity, and may be observed as a change in contrast along with the movement of the scope. However, a small change in contrast is normally detected in the captured image during screening observation. The above exceptional state may be determined by utilizing an additional parameter (described later).

Figure 5:
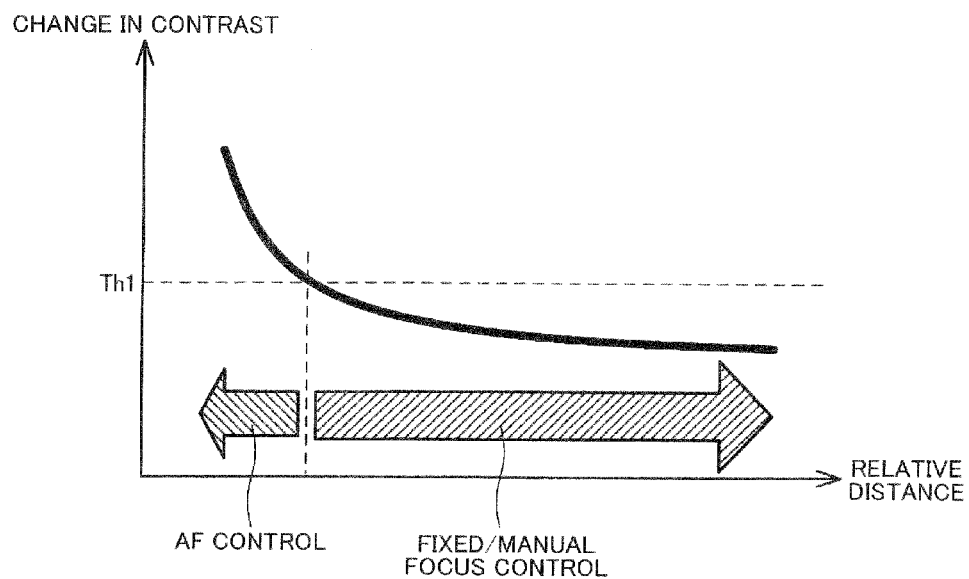
FIG. 5 illustrates an example of the relationship between a change in contrast and a relative distance.

FIG. 5 illustrates an example of the relationship between a change in contrast and the relative distance. FIG. 5 illustrates a modeled relationship between a change in contrast (see FIGS. 4A and 4B) and the relative distance between the end of the scope and the object.

In the first embodiment, whether to start or stop the autofocus control process is selected by utilizing the modeled relationship. More specifically, a threshold value Th1 of a change in contrast is provided. When a change in contrast calculated from the image is larger than the threshold value Th1, it is determined that it is difficult to maintain the in-focus state, and the autofocus control process is performed. When a change in contrast calculated from the image is equal to or smaller than the threshold value Th1, it is determined that it is easy to maintain the in-focus state, and the fixed-focus control process, or a manual focus control process utilizing the zoom lever is performed.

A change in contrast may temporarily occur during screening observation, so that it may be erroneously determined that zoom observation is being performed. Such a change in contrast is an exceptional change in contrast when using the model described with reference to FIG. 5. In the first embodiment, the zoom observation determination accuracy from the image is improved by excluding such an exceptional change in contrast using an additional parameter.

Figure 6A:
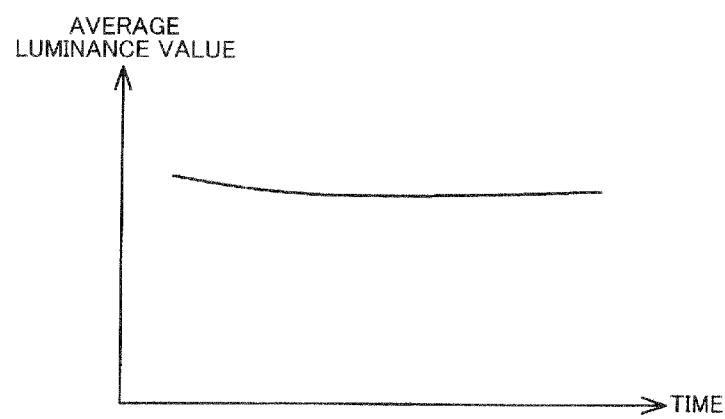
FIG. 6A illustrates an example of the temporal change characteristics of the average luminance value of a captured image during zoom observation.

FIG. 6A schematically illustrates an example of the temporal change characteristics of the average luminance value of the captured image during zoom observation. The term "average luminance value" used herein refers to the average luminance value of a given area of the captured image. The given area may be part of the captured image (e.g., a center area of the captured image), or may be the entirety of the captured image. The end of the scope almost directly confronts the object during zoom observation. Since a light intensity control process performed by a light intensity control section 102 included in the light source section 100 can sufficiently follow a temporal change in the relative distance between the end of the scope and the object during zoom observation, a temporal change in average luminance value is small.

Figure 6B:
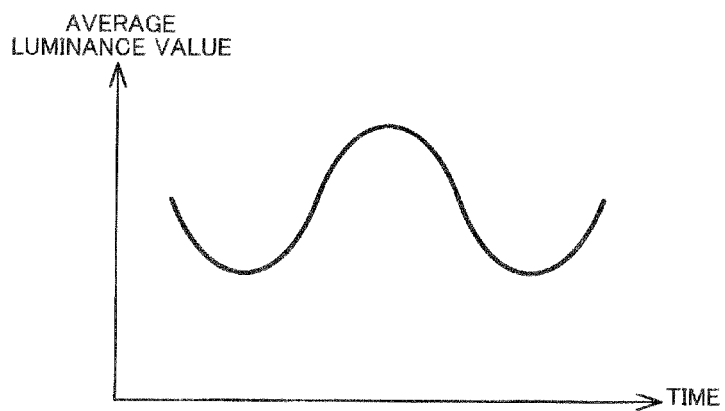
FIG. 6B illustrates an example of the temporal change characteristics of the average luminance value of a captured image during screening observation.

FIG. 6B schematically illustrates an example of the temporal change characteristics of the average luminance value of the captured image during screening observation. The end of the scope rarely directly confronts the object during screening observation, and a temporal change in relative distance during screening observation is larger than that during zoom observation. Therefore, since the light intensity control process performed by the light intensity control section 102 included in the light source section 100 cannot completely follow a temporal change in relative distance, a temporal change in average luminance value increases. Therefore, whether or not zoom observation is being performed can be determined to a certain extent by providing a threshold value Th2 of a change in average luminance per unit time, and determining that zoom observation is being performed when a change in average luminance is smaller than the threshold value Th2.

In the first embodiment, the autofocus control process is started when a change in contrast is larger than the threshold value Th1 and a change in average luminance is smaller than the threshold value Th2 by utilizing the above characteristics. It is possible to accurately determine a zoom observation state that requires the autofocus control process by utilizing the threshold value Th1 and the threshold value Th2 in combination instead of independently utilizing the threshold value Th1 or the threshold value Th2.

2.3. Imaging Optical System

Figure 7:
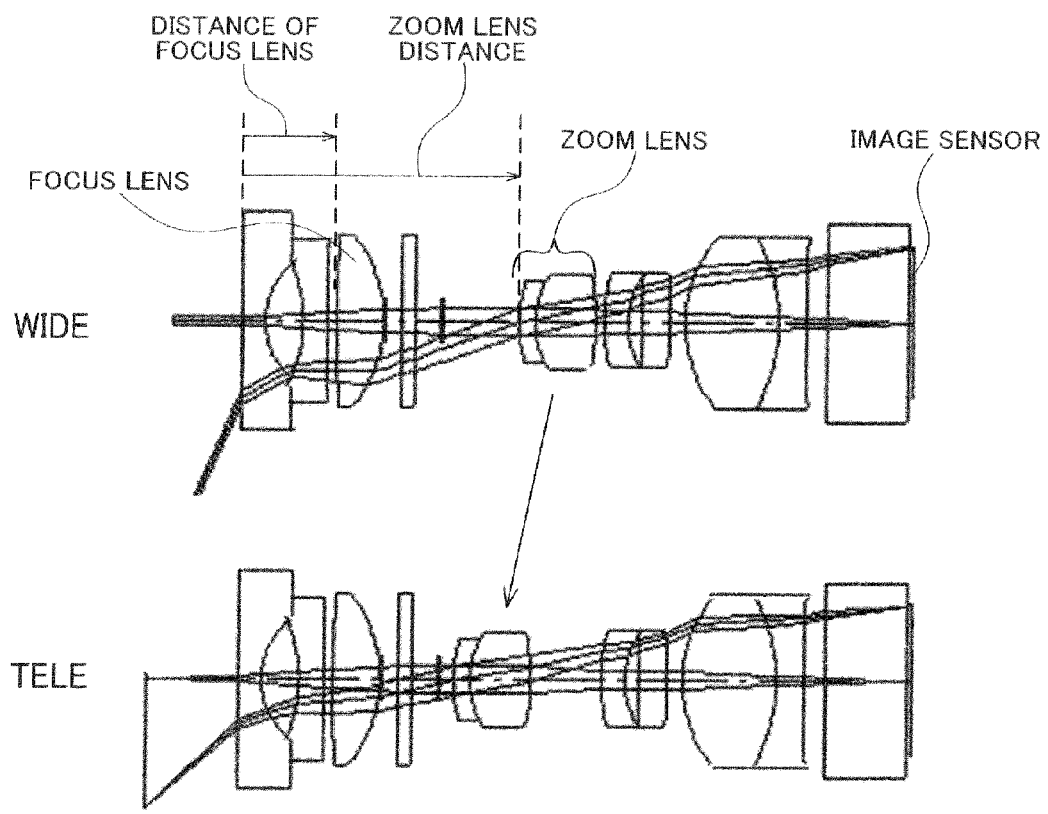
FIG. 7 illustrates a detailed configuration example of an imaging optical system that drives only a zoom lens.

FIG. 7 illustrates a detailed configuration example of an imaging optical system that drives only a zoom lens. The imaging optical system that drives only a zoom lens is configured so that only the zoom lens can be moved in the lens system. The zoom lens is positioned apart from the front end of the lens system at the WIDE end, and is positioned close to the front end of the lens system at the TELE end.

The zoom lens driver section 206 illustrated in FIG. 1 changes the position of the zoom lens (i.e., drives the zoom lens). The position of the zoom lens is set corresponding to the degree of operation performed on the zoom lever 501 illustrated in FIG. 2. Alternatively, the position of the zoom lens is set corresponding to the degree of autofocus control performed by an AF control section 370.

Note that the first embodiment is not limited to a configuration in which the focus state is changed by driving the zoom lens. For example, the imaging optical system according to the first embodiment may be configured so that the zoom lens and the focus lens are driven independently. In this case, the focus state is adjusted by driving the focus lens. The position of the focus lens is set corresponding to the degree of operation of a focus lever (not illustrated in the drawings), or is set corresponding to the degree of autofocus control performed by the AF control section 370.

2.4. In-Focus Object Plane Control Section

Figure 8:
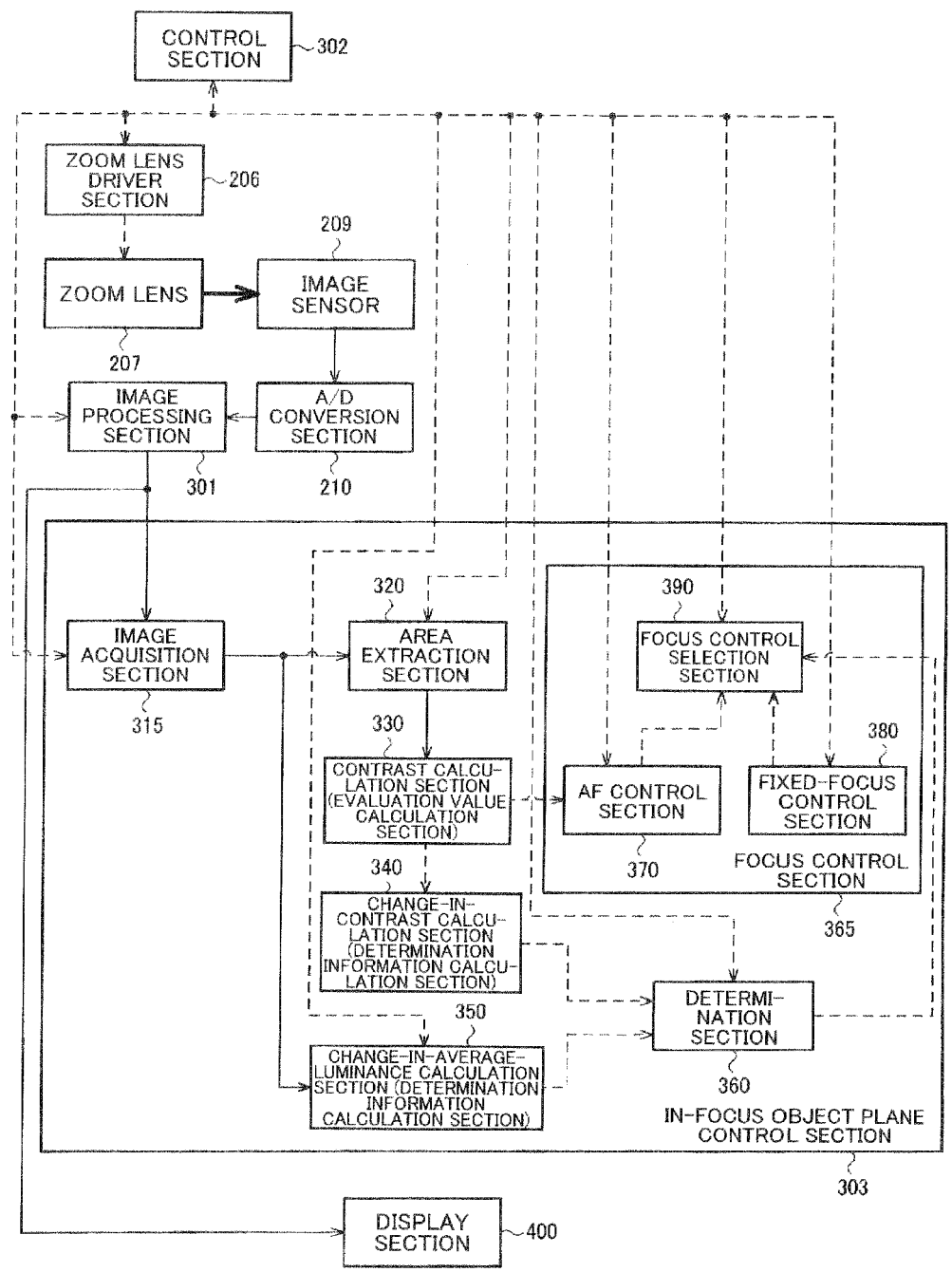
FIG. 8 illustrates a detailed configuration example of an in-focus object plane control section.

FIG. 8 illustrates a detailed configuration example of the in-focus object plane control section that switches the focus control process between the autofocus control process and the fixed-focus control process using the above threshold value determination process. The in-focus object plane control section 303 includes an image acquisition section 315, an area extraction section 320, a contrast calculation section 330, a change-in-contrast calculation section 340, a change-in-average-luminance calculation section 350, a determination section 360, and a focus control section 365.

A data flow between each element, and a process performed by each element are described below. The A/D conversion section 210 converts analog image signals photoelectrically converted by the image sensor 209 (single-chip image sensor) into digital image signals, and outputs the digital image signals to the image processing section 301.

The control section 302 is connected to the image processing section 301. Process parameters (e.g., OB clamp value, WB coefficient, color filter array of the image sensor 209, color correction coefficient, grayscale transformation table, and edge enhancement level) that are stored in the control section 302 in advance are input to the image processing section 301. The image processing section 301 performs image processing on the input digital image signals based on the process parameters, and outputs the resulting image as a captured image (or a display image that can be displayed on a display). The image processing section 301 outputs the captured image to the area extraction section 320, the change-in-average-luminance calculation section 350, and the display section 400.

The image acquisition section 315 acquires the captured image input from the image processing section 301, and outputs the acquired captured image to the area extraction section 320. For example, the image processing section 301 temporarily stores the captured image obtained by image processing in a memory (not illustrated in the drawings), and the image acquisition section 315 reads the captured image stored in the memory to acquire the captured image.

The area extraction section 320 receives information about an area (contrast calculation area) that is used to calculate the contrast value used for the autofocus control process from the control section 302. The area extraction section 320 extracts the image of the contrast calculation area from the captured image output from the image processing section 301 based on the information about the contrast calculation area, and output the extracted image to the contrast calculation section 330. The contrast calculation area is an N×M pixel area that is positioned in a center area of the captured image, for example.

The contrast calculation section 330 converts the color signals of the extracted image output from the area extraction section 320 into luminance signals, and performs a high-pass filter process (or a band-pass filter process) with given frequency characteristics on the luminance signals. The contrast calculation section 330 integrates the results of the high-pass filter process within the extracted image to calculate the contrast value, and outputs the calculated contrast value to the change-in-contrast calculation section 340 and the AF control section 370.

The change-in-contrast calculation section 340 calculates a change in contrast based on the contrast value output from the contrast calculation section 330. More specifically, the change-in-contrast calculation section 340 includes a memory (not illustrated in the drawings) that temporarily stores the contrast value for a given period. The memory includes a ring buffer. The change-in-contrast calculation section 340 overwrites the contrast value that was stored in the memory in the previous given period with the newly calculated contrast value. The change-in-contrast calculation section 340 performs a high-pass filter process (or a band-pass filter process) with given frequency characteristics on the contrast values stored in the memory, and integrates the results of the filter process to calculate a change in contrast. The change-in-contrast calculation section 340 outputs the calculated change in contrast to the determination section 360.

The change-in-average-luminance calculation section 350 receives information about an area (average luminance calculation area) that is used to calculate the average luminance from the control section 302, and receives the captured image from the image processing section 301. The change-in-average-luminance calculation section 350 sets the average luminance calculation area within the captured image based on the information about the average luminance calculation area, calculates the luminance value of each pixel included in the average luminance calculation area, and calculates the sum of the luminance values within the average luminance calculation area as the average luminance value. The change-in-average-luminance calculation section 350 includes a memory (not illustrated in the drawings) that temporarily stores the average luminance value for a given period. The memory includes a ring buffer. The change-in-average-luminance calculation section 350 overwrites the average luminance that was stored in the memory in the previous given period with the newly calculated average luminance value. The change-in-average-luminance calculation section 350 performs a high-pass filter process (or a band-pass filter process) with given frequency characteristics on the average luminance values stored in the memory, and integrates the results of the filter process to calculate a change in average luminance. The change-in-average-luminance calculation section 350 outputs the calculated change in average luminance to the determination section 360.

The determination section 360 receives the change in contrast output from the change-in-contrast calculation section 340, the change in average luminance output from the change-in-average-luminance calculation section 350, and the threshold values Th1 and Th2 output from the control section 302. The determination section 360 performs the threshold value determination process on the change in contrast using the threshold value Th1, and performs the threshold value determination process on the change in average luminance using the threshold value Th2. The determination section 360 determines whether or not the autofocus control process should be performed using the following determination condition.

Specifically, the determination section 360 determines that the autofocus control process should be performed when the determination condition whereby the change in contrast is larger than the threshold value Th1 and the change in average luminance is smaller than the threshold value Th2, is satisfied. The determination section 360 determines that the fixed-focus control process should be performed when the determination condition is not satisfied. The determination section 360 outputs the determination result to the focus control selection section 390 as autofocus control start/stop determination information.

The focus control section 365 performs the autofocus control process when the determination section 360 has determined that the autofocus control process should be performed, and performs the fixed-focus control process when the determination section 360 has determined that the fixed-focus control process should be performed. More specifically, the focus control section 365 includes the AF control section 370, a fixed-focus control section 380, and a focus control selection section 390.

The AF control section 370 receives the contrast value output from the contrast calculation section 330, and lens position information output from the zoom lens driver section 206. The lens position information indicates the position of the movable zoom lens 207. The term "lens position" used herein refers to the distance from a reference point (e.g., the end of the objective lens) to the zoom lens 207 along the optical axis of the imaging optical system, for example. The AF control section 370 includes a memory (not illustrated in the drawings) that temporarily stores the contrast value and the lens position information for a given period. The memory includes a ring buffer. The AF control section 370 overwrites the contrast value and the lens position information that were stored in the memory in the previous given period with the newly calculated contrast value and the newly calculated lens position information.

The AF control section 370 searches the contrast values stored in the memory for the maximum value. When the AF control section 370 has detected the maximum value, the AF control section 370 interpolates a plurality of pieces of lens position information around the maximum value to calculate information about the position of the zoom lens 207 at which the object is in focus as drive target position information. The drive target position information indicates a drive target position to which the zoom lens 207 is driven from the current position. When the AF control section 370 interpolates the lens position information, the AF control section 370 accurately calculates the drive target position information about the zoom lens 207 by weighting the lens positions around the maximum value using the contrast value corresponding to each lens position.

When the AF control section 370 has not detected the maximum value, the AF control section 370 calculates a first difference value that is the difference between a first contrast value and a second contrast value, a second difference value that is the difference between the second contrast value and a third contrast value, a first differential value based on the first difference value or the second difference value, and a second differential value that is the difference between the first difference value and the second difference value. The first contrast value is the latest contrast value stored in the memory, the second contrast value is the contrast value stored in the memory immediately before the first contrast value, and the third contrast value is the contrast value stored in the memory immediately before the second contrast value. The first differential value is the first difference value, for example.

When the calculated second differential value is a negative value, the AF control section 370 predicts the maximum value by extrapolation using the first differential value and the second differential value (e.g., prediction by extrapolation using a quadratic expression), and calculates the information about the position of the zoom lens 207 corresponding to the predicted maximum value as in-focus position information.

When the calculated second differential value is equal to or larger than zero, the AF control section 370 multiplies the first difference value by a given number W and the sign of the first differential value, and adds the resulting value to the latest lens position information about the zoom lens 207 stored in the memory. The resulting value is calculated as the next drive target position information about the zoom lens 207. The given number W is set to a given value that is larger than 1 when the absolute value of the first differential value is smaller than a given threshold value. The given number W is set to 1 when the absolute value of the first differential value is equal to or larger than the given threshold value. The AF control section 370 outputs the calculated drive target position information to the focus control selection section 390.

The fixed-focus control section 380 receives the lens position information about the zoom lens 207 output from the zoom lens driver section 206, and a plurality of pieces of predetermined fixed lens position information output from the control section 302. The fixed-focus control section 380 selects the fixed lens position information that has a minimum difference with the lens position information about the zoom lens 207 from the plurality of pieces of fixed lens position information (i.e., a plurality of pieces of fixed in-focus object plane information), and outputs the selected fixed lens position information to the focus control selection section 390 as the drive target position information. The fixed lens position information output from the control section 302 indicates a discrete lens position that corresponds to the discrete (e.g., five-stage) degree of control of the zoom lever 501 illustrated in FIG. 2.

The focus control selection section 390 selects the drive target position information output from the AF control section 370 or the drive target position information output from the fixed-focus control section 380 based on the autofocus control start/stop determination information output from the determination section 360. The focus control selection section 390 outputs the selected drive target position information to the zoom lens driver section 206.

The zoom lens driver section 206 moves the zoom lens 207 to the lens position indicated by the drive target position information output from the zoom lens driver section 206 based on the drive target position information.

According to the first embodiment, a focus control device includes the image acquisition section 315, an evaluation value calculation section, a determination information calculation section, the determination section 360, and the focus control section 365 (see FIG. 8). The image acquisition section acquires an image captured by an imaging optical system. The evaluation value calculation section calculates a focus evaluation value that is used to evaluate the in-focus state of the image of the object based on the captured image. The determination information calculation section calculates determination information based on the focus evaluation value. The determination section 360 determines whether to start or stop the autofocus control process based on the determination information. The focus control section 365 starts or stops the autofocus control process based on the determination result of the determination section 360.

This makes it possible to automatically start the autofocus control process in the zoom observation state. Specifically, it is possible to automatically determine whether to start or stop the autofocus control process that is required during zoom observation instead of manually switching the focus control process. Therefore, the user can concentrate on medical examination without being bothered by the switch operation, and can reduce the medical examination time.

For example, the focus control device corresponds to the in-focus object plane control section 303. The imaging optical system corresponds to the objective lens 203, the zoom lens 207, and the image sensor 209. The evaluation value calculation section corresponds to the contrast calculation section 330. The determination information calculation section corresponds to the change-in-contrast calculation section 340. Although the first embodiment has been described above taking an example in which the focus evaluation value is the contrast value, and the determination information is a change in contrast, the configuration is not limited thereto. It suffices that the focus evaluation value be a value that is used to evaluate the in-focus state of the object in the image, and the determination information be information that indicates a temporal change in the focus evaluation value.

The expression "starts the autofocus control process" used herein refers to starting a control state in which the focus is adjusted by an autofocus operation (i.e., a transition to the autofocus control process from another focus control process). In the first embodiment, the expression "starts the autofocus control process" refers to a transition to the autofocus control process from the fixed-focus control process. A period from the start to the end of the autofocus control process includes a period from suspension to resumption of the autofocus control process (described later with reference to FIG. 14A, for example). In a period from suspension to resumption of the autofocus control process, the zoom lens (or the focus lens) is set at the lens position that has been set by the autofocus operation before suspension of the autofocus control process (i.e., the focus has been adjusted by the autofocus operation).

Figure 15A:
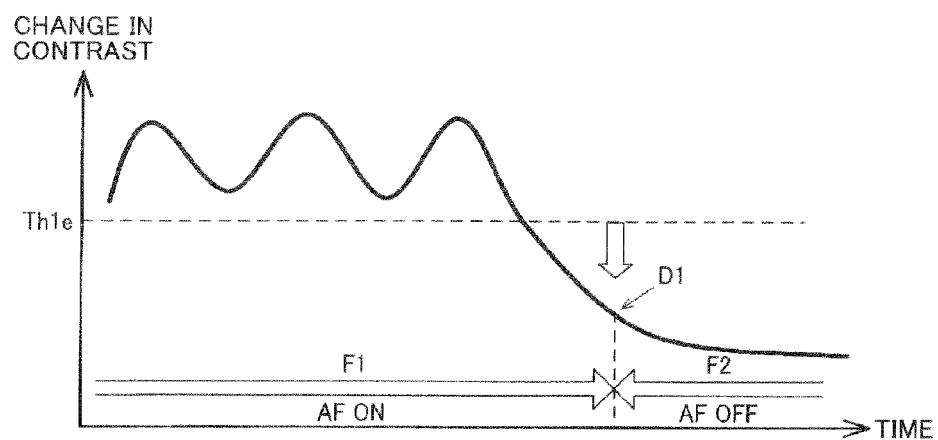
FIGS. 15A and 15B are views illustrating a method that stops an autofocus control process.

The evaluation value calculation section may calculate the contrast value within a given area of the captured image as the focus evaluation value. The determination information calculation section may calculate a change in contrast that indicates a temporal change in the contrast value as the determination information. The focus control section 365 may start the autofocus control process when it has been determined that the change in contrast satisfies a start condition. The focus control section 365 may stop the autofocus control process when it has been determined that the change in contrast satisfies a stop condition (described later with reference to FIG. 15A, for example).

This makes it possible to determine whether to start or stop the autofocus control process based on a temporal change in the contrast value. More specifically, the autofocus control process can be performed during zoom observation by utilizing the fact that a change in the contrast value during zoom observation is larger than that during screening observation.

Although the first embodiment has been described above taking an example in which the change in contrast is obtained by performing the high-pass filter process on the contrast value, the configuration is not limited thereto. It suffices that the change in contrast be information that indicates a temporal change in the contrast value.

The focus control device may include a second determination information calculation section that calculates second determination information based on luminance information about the captured image. The determination section 360 may determine whether or not the change in contrast and the second determination information satisfy the start condition. The focus control section 365 may start the autofocus control process when it has been determined that the change in contrast and the second determination information satisfy the start condition.

Specifically, the second determination information calculation section may calculate a change in luminance (change in average luminance) as the second determination information, the change in luminance being a temporal change in average luminance within a given area of the captured image. The focus control section 365 may start the autofocus control process when it has been determined that the start condition is satisfied. The start condition is a condition that the change in contrast is larger than the first threshold value Th1 and the change in luminance is smaller than the second threshold value Th2.

This makes it possible to determine whether to start or stop the autofocus control process based on the change in contrast and the change in average luminance. More specifically, it is possible to accurately determine whether or not the observation state is the zoom observation state that requires the autofocus control process by utilizing the fact that a change in average luminance during screening observation is larger than that during zoom observation, as described above with reference to FIG. 6B, for example.

For example, the second determination information calculation section corresponds to the change-in-average-luminance calculation section 350 illustrated in FIG. 8. Alternatively, the second determination information calculation section corresponds to a luminance distribution calculation section 351 described later with reference to FIG. 12. Although the first embodiment has been described above taking an example in which the luminance information is the average luminance value, and the second determination information is a temporal change in the average luminance value, the configuration is not limited thereto. It suffices that the luminance information be information based on the luminance value of the captured image, and the second determination information be information for distinguishing the screening observation state from the zoom observation state.

3. Second Embodiment 3.1. Endoscope Apparatus

Figure 9:
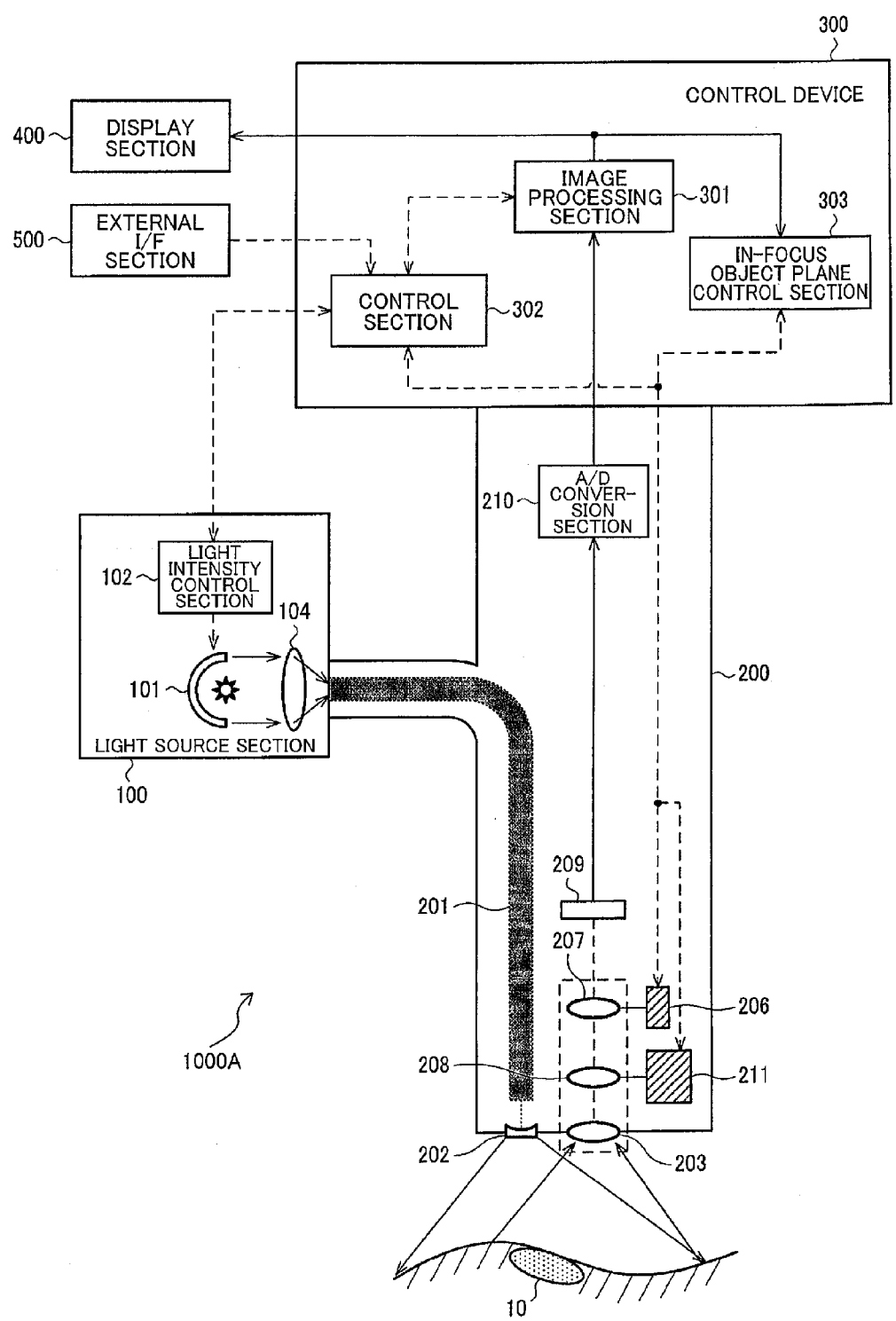
FIG. 9 illustrates a configuration example of an endoscope apparatus according to a second embodiment.

FIG. 9 illustrates a configuration example of an endoscope apparatus 1000A according to a second embodiment of the invention. The endoscope system (apparatus) 1000A includes a light source section 100, an imaging section 200, a control device (processor section) 300, a display section 400, and an external I/F section 500. The endoscope apparatus 1000A according to the second embodiment is basically configured in the same manner as the endoscope apparatus 1000 according to the first embodiment. Note that the same elements as those described above in connection with the first embodiment are respectively indicated by the same signs, and description thereof is appropriately omitted.

The second embodiment differs from the first embodiment in that the imaging optical system drives the zoom lens and the focus lens, and the in-focus object plane control section 303 switches the focus control process between the autofocus control process and the fixed-focus control process using a change in contrast and the luminance distribution of the image.

The above feature of the imaging optical system is described below. The imaging section 200 includes a light guide fiber 201, an illumination lens 202, an objective lens 203, a zoom lens driver section 206, a zoom lens 207, a focus lens 208, an image sensor 209, an A/D conversion section 210, and a focus lens driver section 211.

The imaging optical system according to the second embodiment drives the zoom lens and the focus lens of the lens system described above with reference to FIG. 7. In this case, the autofocus control process is performed by driving the focus lens instead of driving the zoom lens (refer to the first embodiment). This is advantageous in that a change in magnification occurs to only a small extent when performing the autofocus control process, so that the contrast value of the object can be calculated in a stable manner. Moreover, a display image that does not change in magnification and is easy to observe can be obtained even during the autofocus control process.

The endoscope apparatus illustrated in FIG. 9 is configured so that the zoom lens 207 is driven by the zoom lens driver section 206 in synchronization with the operation performed on the zoom lever 501 illustrated in FIG. 2 independently of the autofocus control process. The focus lens 208 is driven by the focus lens driver section 211 during the autofocus control process and the fixed-focus control process.

Note that a change in display magnification occurs to only a small extent when performing the autofocus control process by driving the focus lens 208. Therefore, the above configuration is suitable for a continuous autofocus process that continuously focuses the imaging optical system on the object.

3.2. Switch Control Method

The switch control process that switches the focus control process between the autofocus control process and the fixed-focus control process is described below. In the second embodiment, whether to start or stop the autofocus control process is determined by estimating the imaging scene using a method that differs from the method employed in the first embodiment.

Figure 10A:
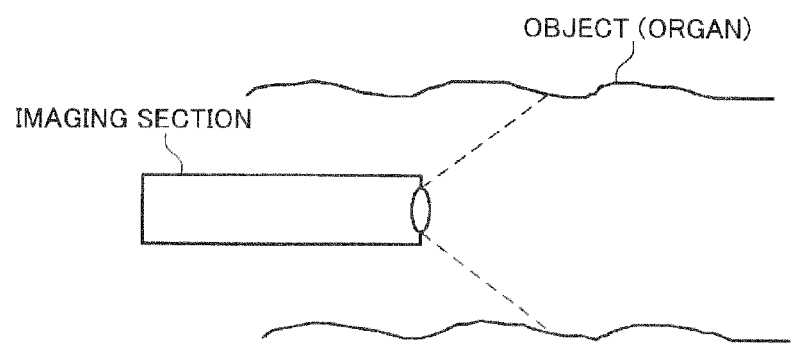
FIGS. 10A to 10C illustrate an example of an observation state using an endoscope.
Figure 10B:
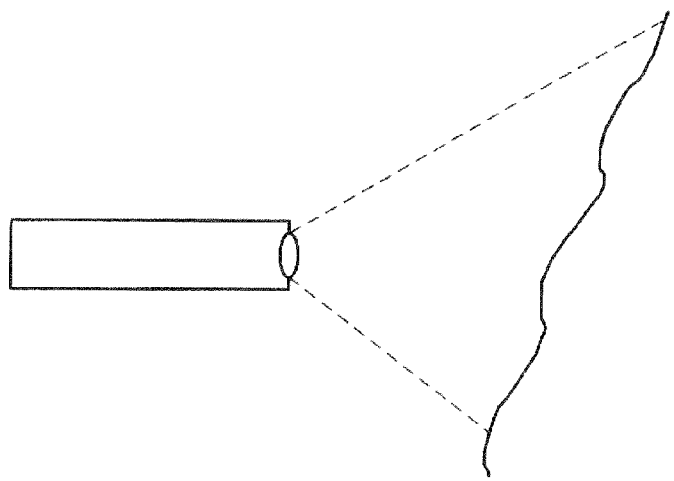
Figure 10C:
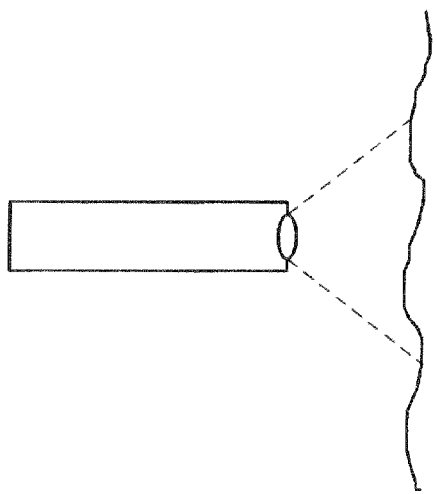
Figure 11A:
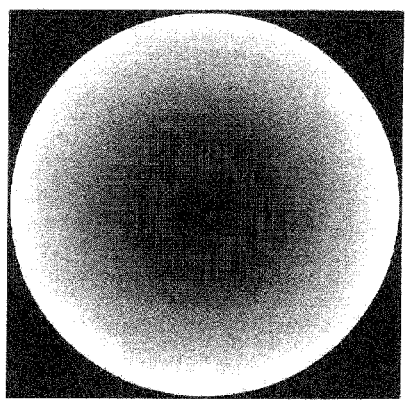
FIGS. 11A to 11C illustrate an example of the luminance distribution of a captured image in each observation state.
Figure 11B:
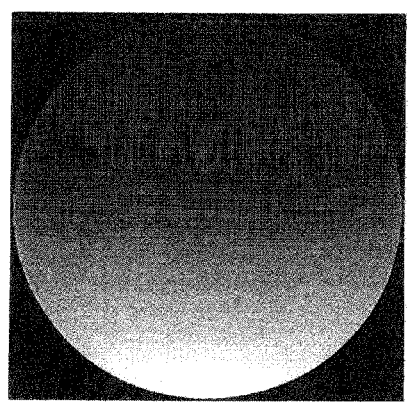
Figure 11C:
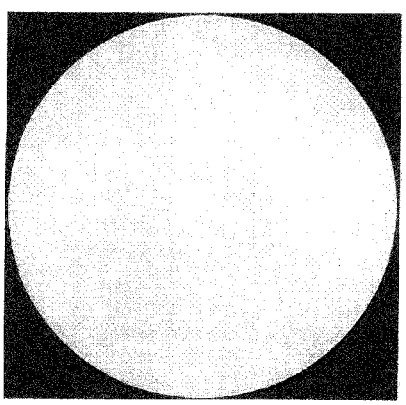

As illustrated in FIGS. 10A to 10C, the observation state (observation scene) using an endoscope is roughly classified into three observation states. FIG. 10A illustrates a screening observation state along a tubular cavity. The display image obtained in this state normally has the luminance distribution illustrated in FIG. 11A. FIG. 10B illustrates a state in which tissue is closely observed. The display image obtained in this state normally has the luminance distribution illustrated in FIG. 11B. FIG. 10C illustrates a zoom observation state. The display image obtained in this state normally has the luminance distribution illustrated in FIG. 11C.

Figure 11D:
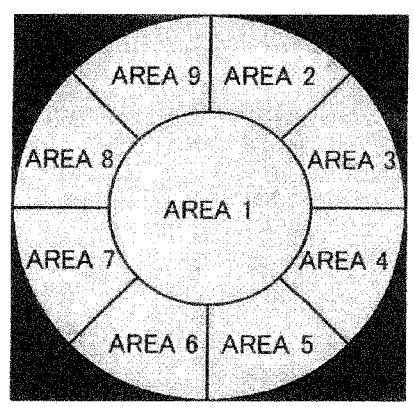
FIG. 11D illustrates an example of area division.

In the second embodiment, at least the state illustrated in FIG. 10A (i.e., the luminance distribution illustrated in FIG. 11A) is determined to be a state in which the autofocus control process is not performed. This makes it possible to improve the change-in-contrast determination accuracy. As illustrated in FIG. 11D, the display image is divided into a center area 1 and peripheral areas 2 to 9, and the observation state is determined by determining the average luminance distribution in each area.

In the second embodiment, the autofocus control process is performed when it has been determined that the observation state is the zoom observation state illustrated in FIG. 10C. The observation state illustrated in FIG. 10B is determined using a change in contrast that is also used in the first embodiment. For example, when the zoom lens is positioned at the WIDE end, and the end of the scope is not positioned close to the object, a sufficiently wide depth of field is obtained as described with reference to FIG. 3. Therefore, a change in contrast is small. In contrast, when the zoom lens is positioned at the TELE end, and the end of the scope is positioned close to the object, a narrow depth of field is obtained as described with reference to FIG. 3. Therefore, the object frequently becomes out of focus due to the motion (e.g., pulsation) of the object (i.e., a change in contrast can be detected).

3.3. In-focus Object Plane Control Section

Figure 12:
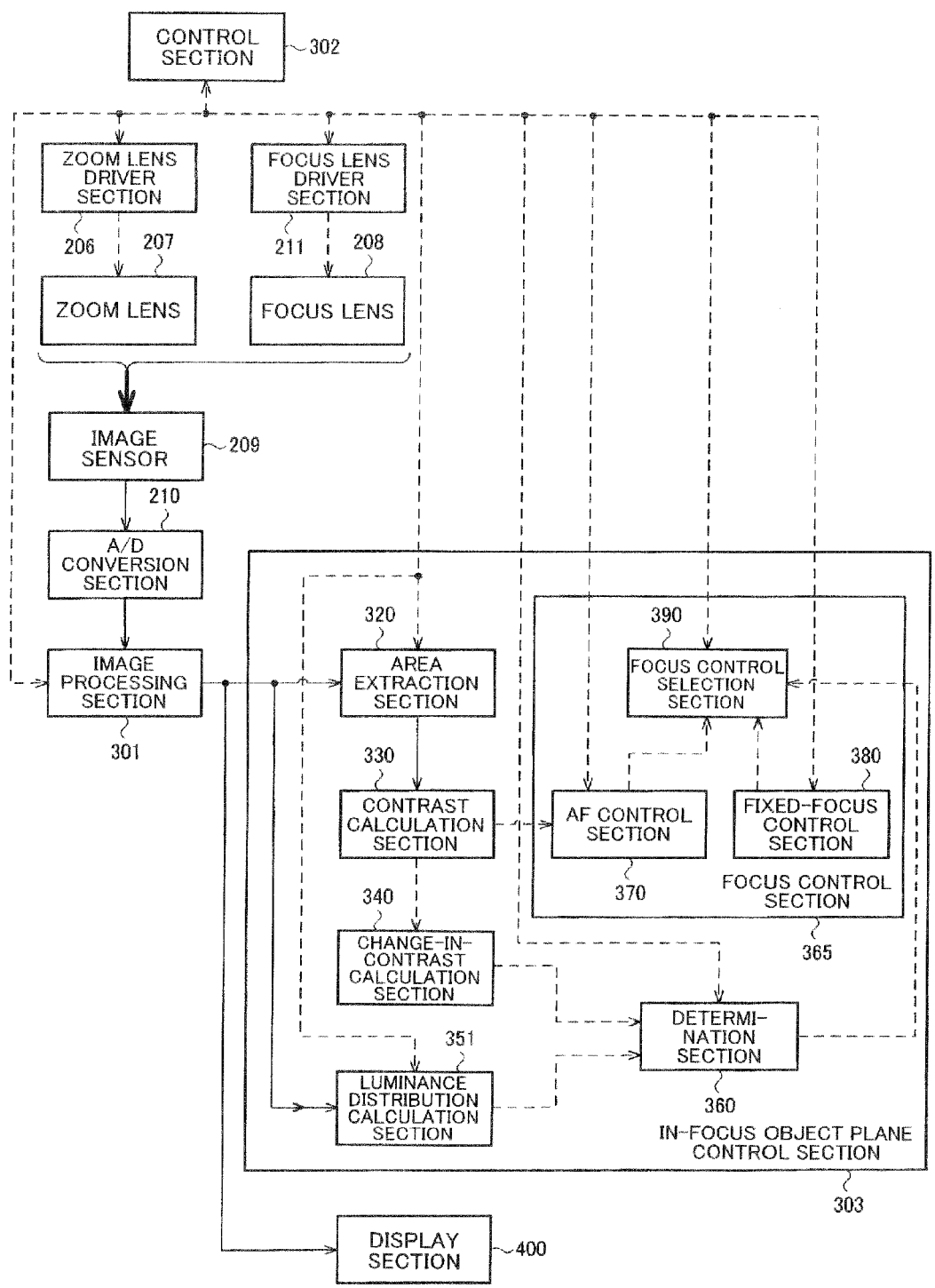
FIG. 12 illustrates a detailed configuration example of an in-focus object plane control section according to the second embodiment.

FIG. 12 illustrates a detailed configuration example of the in-focus object plane control section 303 according to the second embodiment. The in-focus object plane control section 303 includes an area extraction section 320, a contrast calculation section 330, a change-in-contrast calculation section 340, a luminance distribution calculation section 351, a determination section 360, and a focus control section 365. The focus control section 365 includes an AF control section 370, a fixed-focus control section 380, and a focus control selection section 390.

The details of the luminance distribution calculation section 351, the determination section 360, and the fixed-focus control section 380 are described below.

The luminance distribution calculation section 351 receives the captured image from the image processing section 301, and receives segmented area information used to calculate the luminance distribution in the captured image from the control section 302. The luminance distribution calculation section 351 divides the captured image into a plurality of segmented areas based on the segmented area information, calculates the luminance value of each pixel of each segmented area, calculates the total luminance value of each segmented area, and divides the total luminance value of each segmented area by the number of pixels to obtain a segmented area average luminance value. For example, the captured image is divided into the nine segmented areas illustrated in FIG. 11D. The average luminance value of each area is calculated, and output to the determination section 360 as the segmented area average luminance value.

The determination section 360 receives a change in contrast output from the change-in-contrast calculation section 340, the segmented area average luminance value output from the luminance distribution calculation section 351, and threshold values Th1 and Th3 output from the control section 302. The determination section 360 performs the threshold value determination process on the change in contrast using the threshold value Th1, and performs the threshold value determination process on the segmented area average luminance value using the threshold value Th3. The determination section 360 determines whether or not the autofocus control process should be performed using the following determination condition.

Specifically, the determination section 360 calculates the number of areas among the areas 2 to 9 (peripheral areas) illustrated in FIG. 11D that have a segmented area average luminance value larger than that of the area 1. The determination section 360 determines that the autofocus control process should be performed when the determination condition whereby the change in contrast is larger than the threshold value Th1 and the number of areas that have a segmented area average luminance value larger than that of the area 1 is smaller than the threshold value Th3, is satisfied. The determination section 360 determines that the fixed-focus control process should be performed when the determination condition is not satisfied. The determination section 360 outputs the determination result to the focus control selection section 390 as the autofocus control start/stop determination information.

The details of the threshold value determination process using the threshold value Th3 are described below taking the areas 1 to 9 illustrated in FIG. 11D as an example. For example, when the majority (five areas) of the areas 2 to 9 positioned in a peripheral area of the display image have an average luminance higher than that of the area 1 positioned in a center area of the display image, it is determined that the display image has the luminance distribution illustrated in FIG. 11A (i.e., the screening observation state along the tubular cavity illustrated in FIG. 10A).

When performing the threshold value determination process on a change in contrast, it may be determined that the change in contrast is equal to or larger than the threshold value Th1 during screening observation due to insertion/removal or angular motion of the imaging section 200. For example, the contrast value decreases when a dark deep area of the tubular cavity is positioned within the contrast-calculation extraction target area positioned in the center area of the image, and increases when the sidewall of the tubular cavity is positioned within the extraction target area. When such a state frequently occurs due to the motion of the end of the scope, the change in contrast approximates the change in contrast during zoom observation illustrated in FIG. 4A. Therefore, it is likely that a determination error occurs. In the second embodiment, the scene is determined using the segmented area average luminance, and the autofocus operation is not started when the observation state is a screening observation state along a tubular cavity in order to decrease the probability that a determination error occurs.

The fixed-focus control section 380 controls the position of the focus lens 208 instead of the position of the zoom lens 207. The fixed-focus control section 380 receives home position information output from the control section 302, and current position information about the zoom lens 207 output from the zoom lens driver section 206. The zoom lens 207 can be set at a plurality of discrete positions. The home position of the focus lens 208 is set corresponding to each discrete position, and the home position information indicates the home position of the focus lens 208. The fixed-focus control section 380 selects the home position information that corresponds to the current position information about the zoom lens 207, and outputs the selected home position information to the focus control selection section 390 as the drive target position information. When the drive target position information has been selected by the focus control selection section 390, the focus lens 208 is returned to the home position based on the home position information.

The AF control section 370 performs a process in the same manner as in the first embodiment using the position information about the focus lens 208 output from the focus lens driver section 211 as the lens position information. More specifically, the AF control section 370 stores the lens position information about the focus lens 208 and the contrast value in a given period in the ring buffer (not illustrated in the drawings), and calculates information (drive target position information) about a position to which the focus lens 208 is moved based on the lens position information and the contrast value. The AF control section 370 outputs the calculated drive target position information to the focus control selection section 390.

The focus control selection section 390 selects the drive target position information output from the AF control section 370 or the drive target position information output from the fixed-focus control section 380 based on the autofocus control start/stop determination information. The zoom lens driver section 206 moves the zoom lens 207 to the lens position indicated by the selected drive target position information based on the drive target position information.

Although the second embodiment has been described above taking an example in which the imaging optical system drives the zoom lens and the focus lens, the configuration is not limited thereto. For example, whether or not to start the autofocus operation may be determined using the luminance distribution when the imaging optical system drives only the zoom lens.

According to the second embodiment, the second determination information calculation section (luminance distribution calculation section 351 illustrated in FIG. 12) may calculate information that indicates the luminance distribution of the captured image as the second determination information.

More specifically, the determination information calculation section may set a first area that is a center area of the captured image, and second to nth areas (e.g., second to ninth areas) that are obtained by dividing a peripheral area of the captured image, as described with reference to FIG. 11D. The determination information calculation section may calculate information that indicates the number of areas among the second to nth areas that have an average luminance higher than that of the first area as the information that indicates the luminance distribution. The focus control section 365 may start the autofocus control process when it has been determined that the start condition is satisfied. The start condition is a condition that the change in contrast is larger than the first threshold value Th1 and the number of areas that have an average luminance higher than that of the first area is smaller than the third threshold value Th3.

This makes it possible to determine whether or not to start the autofocus control process based on the change in contrast and the number of areas that have an average luminance higher than that of the first area. More specifically, it is possible to accurately determine whether or not the observation state is the zoom observation state that requires the autofocus control process by utilizing the fact that the center area of the captured image is darker than the peripheral area of the captured image during screening observation, as described above with reference to FIGS. 10A to 11D.

4. Modifications of Second Embodiment

Although the above embodiments have been described taking an example in which the average luminance value or the luminance distribution of the captured image is used to determine whether or not to start the autofocus control process, the configuration is not limited thereto. For example, a light intensity control value may be used to determine whether or not to start the autofocus control process. An example in which the light intensity control value is used to determine whether or not to start the autofocus control process is described below as a modification of the second embodiment.

Figure 13:
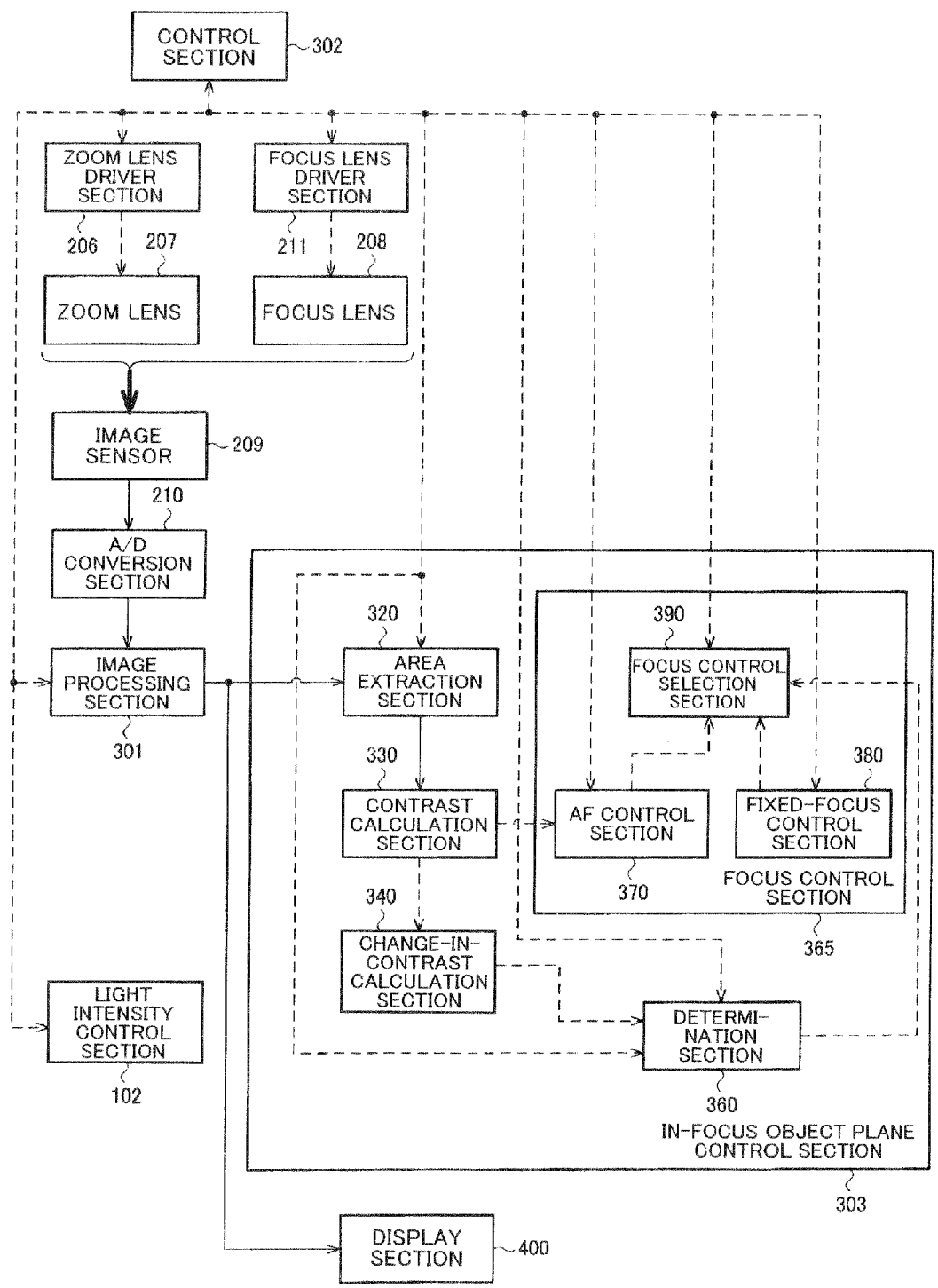
FIG. 13 illustrates a detailed configuration example of an in-focus object plane control section according to a modification of the second embodiment.

FIG. 13 illustrates a detailed configuration example of the in-focus object plane control section 303 according to the modification of the second embodiment. The in-focus object plane control section 303 includes an area extraction section 320, a contrast calculation section 330, a change-in-contrast calculation section 340, a determination section 360, and a focus control section 365. The focus control section 365 includes an AF control section 370, a fixed-focus control section 380, and a focus control selection section 390. Note that the same elements as those described above in connection with the first embodiment and the second embodiment are respectively indicated by the same signs, and description thereof is appropriately omitted.

This modification differs from the second embodiment in that the luminance distribution calculation section is omitted, and the light intensity control value output from the light intensity control section 102 is input directly to the determination section 360.

More specifically, the determination section 360 receives a change in contrast output from the change-in-contrast calculation section 340, the light intensity control value output from the light intensity control section 102, and threshold values Th1 and Th4 output from the control section 302. The determination section 360 performs the threshold value determination process on the change in contrast using the threshold value Th1, and performs the threshold value determination process on the light intensity control value using the threshold value Th4.

Note that the term "light intensity control value" used herein refers to a control value that indicates the intensity of illumination light applied to the object. The light intensity control value is adjusted by the light intensity control section 102 by performing the light intensity control process. For example, when controlling the intensity of light using an aperture (not illustrated in the drawings), the light intensity control value indicates the opening of the aperture. When the light source is an LED of which the intensity of light is controlled by a drive current, the light intensity control value indicates the drive current. The following description is given taking an example in which the light intensity control value increases as the intensity of illumination light increases. Note that the configuration is not limited thereto.

The determination section 360 determines whether or not the autofocus control process should be performed using the following determination condition. Specifically, the determination section 360 determines that the autofocus control process should be performed when the determination condition whereby the change in contrast is larger than the threshold value Th1 and the light intensity control value is smaller than the threshold value Th4, is satisfied. The determination section 360 determines that the fixed-focus control process should be performed when the determination condition is not satisfied. The determination section 360 outputs the determination result to the focus control selection section 390 as the autofocus control start/stop determination information.

The details of the threshold value determination process using the threshold value Th4 are described below. The light source section 100 controls the intensity of illumination light emitted through the illumination lens 202 that is provided at the end of the imaging section 200 to adjust the exposure of the image of the object formed on the image sensor 209 to correct exposure. The light intensity control section 102 performs the light intensity control process by controlling the intensity of light emitted from the white light source 101. Since the illumination light emitted through the illumination lens 202 is diffused light, correct exposure can be obtained at a low intensity when the relative distance between the object (tissue) and the objective lens 203 is short. Specifically, the intensity of illumination light during zoom observation is lower than that during screening observation due to the light intensity control process. Therefore, whether or not the observation state is the zoom observation state can be determined with a certain accuracy by monitoring the light intensity control value output from the light intensity control section 102.

According to this modification, the focus control device may include a light intensity control section (light intensity control section 102 illustrated in FIG. 13) that adjusts the intensity of illumination light that illuminates the object so that the captured image is captured at the correct exposure. The light intensity control section may output the light intensity control value that indicates the intensity of illumination light. The determination section 360 may determine whether or not the change in contrast and the light intensity control value satisfy the start condition. The focus control section 365 may start the autofocus control process when it has been determined that the change in contrast and the light intensity control value satisfy the start condition.

More specifically, the focus control section 365 may start the autofocus control process when it has been determined that the start condition is satisfied. The start condition is a condition that the change in contrast is larger than the first threshold value Th1 and the light intensity control value is smaller than the fourth threshold value Th4.

This makes it possible to determine whether or not to start the autofocus control process based on the change in contrast and the light intensity control value. More specifically, it is possible to accurately determine whether or not the observation state is the zoom observation state that requires the autofocus control process by utilizing the fact that the intensity of illumination light is decreased during zoom observation by the light intensity control process since the object is positioned close to the end of the scope.

5. Time-series Control Method

A time-series control method that starts, suspends, resumes, and stops the autofocus control process is described below. The following description is given taking a single autofocus process as an example. Note that the configuration is not limited thereto.

Note that the following description is given on the assumption that a change in average luminance described above in connection with the first embodiment, or the luminance distribution or the light intensity control value described above in connection with the second embodiment, satisfies the determination condition.

Figure 14A:
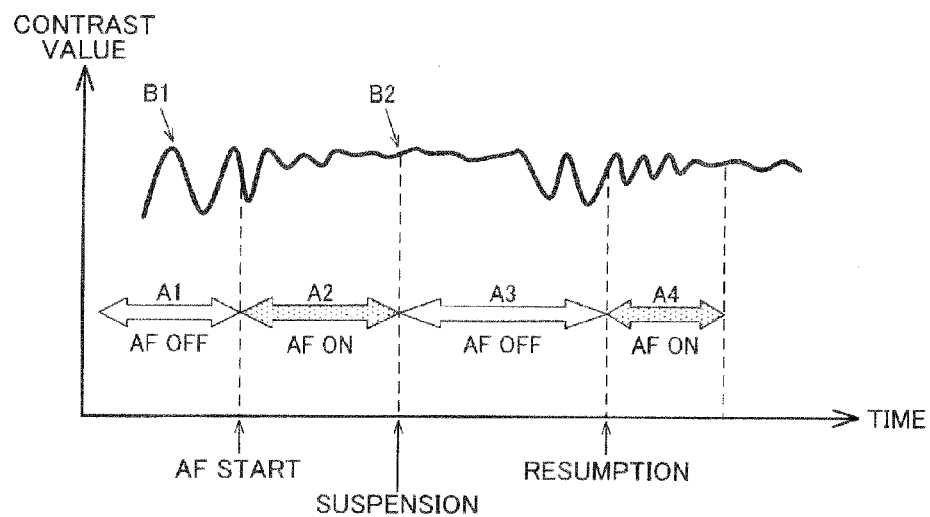
FIGS. 14A and 14B are views illustrating a time-series autofocus control method.

As illustrated in FIG. 14A, the autofocus control state is classified as a state in which the autofocus control process is enabled ("AF ON" indicated by A2 and A4), or a state in which the autofocus control process is disabled ("AF OFF" indicated by A1 and A3) corresponding to a change in contrast value. The autofocus control process is started when it has been determined that the change in contrast is larger than the threshold value. The autofocus control process is disabled before the autofocus control process is started and after the autofocus control process has been stopped, and is repeatedly enabled and disabled until the autofocus control process is stopped after the autofocus control process has been started.

Suppose that a temporal change in contrast value indicated by B1 in FIG. 14A has occurred. The change-in-contrast calculation section 340 calculates a change in contrast by performing the high-pass filter process on the contrast values obtained within the given period from the current time. Therefore, the change in contrast is delayed corresponding to the given period (see FIG. 14B). As indicated by C1 in FIG. 14B, the autofocus control process is started when the change in contrast has exceeded the threshold value Th1.

As indicated by B2 in FIG. 14A, the autofocus control process is suspended when the AF control section 370 has determined that the object is in focus. The AF control section 370 outputs autofocus control suspension information to the control section 302 when the AF control section 370 has determined that the object is in focus. The autofocus control suspension information is output to the determination section 360 via the control section 302. When the determination section 360 has received the autofocus control suspension information, the determination section 360 determines whether or not to stop the autofocus control process using only the threshold value determination process on the change in average luminance, the luminance distribution, or the light intensity control value without taking account of the result of the threshold value determination process on the change in contrast.

Figure 14B:
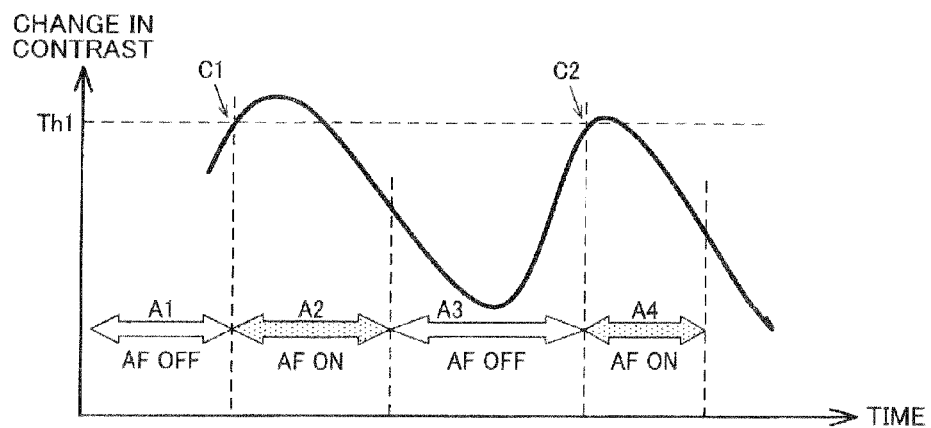

As indicated by C2 in FIG. 14B, the autofocus control process is resumed when the change in contrast has exceeded the threshold value Th1 after the autofocus control process has been suspended. In the start/suspension sequence, the single AF process is triggered by start determination, and suspended by in-focus determination. This sequence may similarly be applied to the first embodiment and the second embodiment.

Figure 15B:
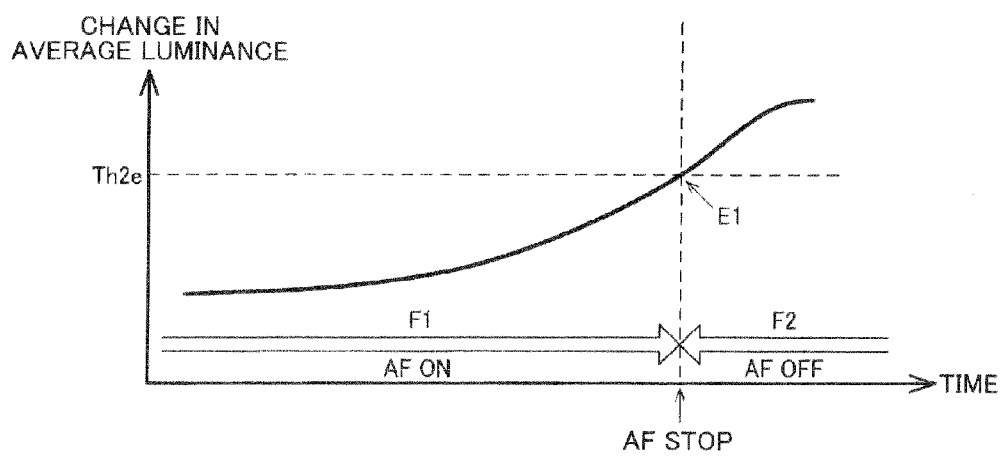

A control process that stops the autofocus control process is described below. This control process may be applied to the single AF process and the continuous AF process. The determination section 360 stops the autofocus control process, and switches the focus control process to the fixed-focus control process when the determination condition whereby the change in contrast is equal to or smaller than a threshold value Th1e (see D1 in FIG. 15A) and the change in average luminance is equal to or larger than a threshold value Th2e (or the luminance distribution is equal to or larger than a threshold value Th3e, or the light intensity control value is equal to or larger than a threshold value Th4e) (see E1 in FIG. 15B), is satisfied. Specifically, a transition from a state in which the autofocus control process is enabled (see F1) to a state in which the autofocus control process is disabled (see F2) occurs.

This control process may be applied to the first embodiment and the second embodiment. In the first embodiment, since the autofocus control process is performed by driving the zoom lens, the display image changes in magnification during the focus operation. It is possible to deal with such a situation by detecting a change in magnification, and adjusting the magnification of the display image using an electronic zoom.

According to the above configuration, the focus control section 365 may suspend the autofocus control process when it has been determined that the object is in focus after the autofocus control process has been started. The focus control section 365 may resume the autofocus control process when it has been determined that the start condition is satisfied after the autofocus control process has been suspended.

More specifically, the autofocus control process may control a single autofocus operation that focuses the imaging optical system on the object only once. In this case, the focus control section 365 may perform the single autofocus operation when it has been determined that the start condition is satisfied, as described with reference to FIG. 14A, for example. The focus control section 365 may suspend the single autofocus operation until it is determined that the start condition is satisfied when it has been determined that the object is in focus during the single autofocus operation. The focus control section 365 may resume the single autofocus operation when it has been determined that the start condition is satisfied.

This makes it possible to suspend and resume the autofocus control process after the autofocus control process has been started. For example, when the imaging optical system drives only the zoom lens, as described with reference to FIG. 7, the zoom magnification changes due to the autofocus operation. The zoom magnification can be made constant by suspending the autofocus control process when it has been determined that the object is in focus, so that the visibility of the object can be improved.

The determination section 360 may determine whether or not the change in contrast and the second determination information satisfy the stop condition. The focus control section 365 may stop the autofocus operation when it has been determined that the change in contrast and the second determination information satisfy the stop condition.

Specifically, the second determination information calculation section (i.e., the change-in-average-luminance calculation section 350 illustrated in FIG. 8, or the luminance distribution calculation section 351 illustrated in FIG. 12) may calculate a change in luminance (i.e., a temporal change in average luminance in a given area of the captured image) (or information that indicates the luminance distribution of the captured image) as the second determination information. More specifically, the focus control section 365 may stop the autofocus control process when it has been determined that the stop condition is satisfied. The stop condition is a condition that the change in contrast is smaller than a fifth threshold value Th1e that is equal to or smaller than the first threshold value Th1 and the change in luminance is larger than a sixth threshold value Th2e that is equal to or larger than the second threshold value Th2 (or a seventh threshold value Th3e that is equal to or larger than the third threshold value Th3).

This makes it possible to determine whether or not to stop the autofocus control process based on the change in contrast and the second determination information based on the luminance information. Specifically, it is possible to stop the autofocus control process when the observation state has transitioned from the zoom observation state that requires the autofocus control process.

The determination section 360 may determine whether or not the change in contrast and the light intensity control value satisfy the stop condition, and the focus control section 365 may stop the autofocus control process when it has been determined that the change in contrast and the light intensity control value satisfy the stop condition.

More specifically, the focus control section 365 may stop the autofocus control process when it has been determined that the stop condition is satisfied. The stop condition is a condition that the change in contrast is smaller than the fifth threshold value Th1e that is equal to or smaller than the first threshold value Th1 and the light intensity control value is larger than an eighth threshold value Th4e that is equal to or larger than the fourth threshold value Th4.

This makes it possible to determine whether or not to stop the autofocus control process based on the change in contrast and the light intensity control value. More specifically, the autofocus control process can be stopped when a transition from the zoom observation state has occurred by utilizing the fact that the intensity of illumination light during screening observation is higher than that during zoom observation due to the light intensity control process.

Figure 16:
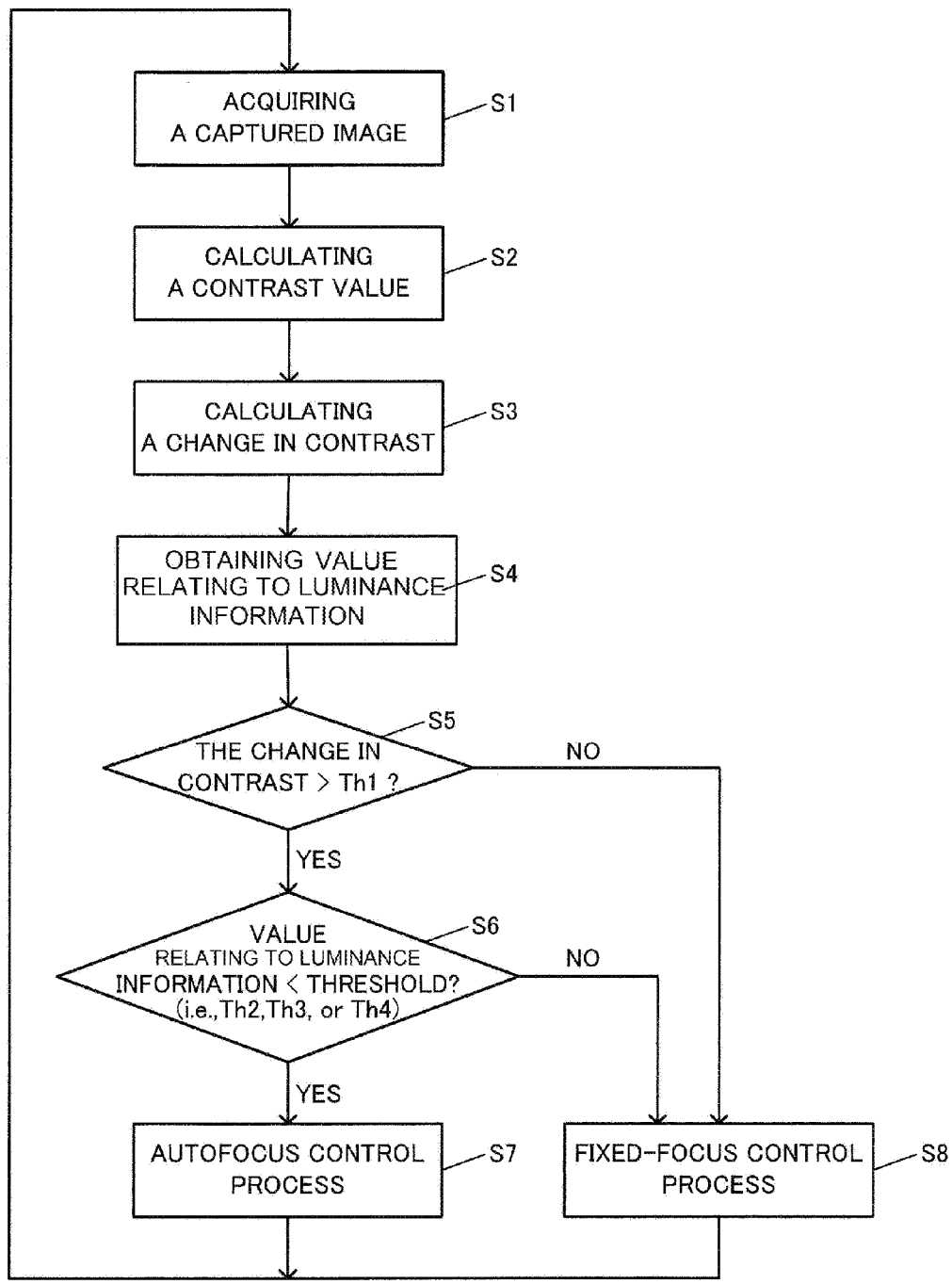
FIG. 16 illustrates a method of operating an endoscope apparatus.

FIG. 16 illustrates a method performed by an endoscope according to an aspect of the present invention. As shown in Fig.16, the image acquisition section 315 acquires a captured image that has been captured by an imaging optical system (step S1). The contrast calculation section 330 calculates a contrast value based on the captured image (step S2). The change-in-contrast calculation section 340 calculates a change in contrast (step S3). The change-in-average luminance calculation section 350 calculates a change in average luminance, the luminance distribution calculation section 351 calculates a luminance distribution, or the light intensity control section 102 outputs a light intensity control value (step S4). The determination section 360 determines whether the change in contrast is larger than the threshold value Thi (step S5), and whether the change in average luminance, the luminance distribution (i.e., the number of the second to nth areas that have a segmented area average luminance value larger than that of the first area), or the light intensity control value is less than a threshold value Th2, Th3, or Th4 (step S6). The focus control section 365 performs the autofocus control process (step S7) when the change in contrast has been determined to be larger than the threshold value Thi (step S5 YES) and when the change in luminance, luminance distribution, or the light intensity control value is less than the threshold value Th2, Th3, or Th4 (step S6 YES). The focus control section 365 performs the fixed-focus control process (step S8) when the change in contrast has been determined not to be larger than the threshold value Thi (step S5 NO), or when the change in luminance or light intensity control value is not larger than the threshold value Th2, Th3, or Th4 (step S6 NO).

The embodiments according to the invention and the modifications thereof have been described above. Note that the invention is not limited to the above embodiments and the modifications thereof. Various modifications and variations may be made without departing from the scope of the invention. A plurality of elements described in connection with the above embodiments and the modifications thereof may be appropriately combined to implement various configurations. For example, some of the elements described in connection with the above embodiments and the modifications thereof may be omitted. Some of the elements described in connection with different embodiments or modifications thereof may be appropriately combined. Various modifications and applications are thus possible without materially departing from the novel teachings and advantages of the invention.

Any term cited with a different term having a broader meaning or the same meaning at least once in the specification and the drawings can be replaced by the different term in any place in the specification and the drawings.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A focus control device comprising:
   an image acquisition section that acquires a captured image that has been captured by an imaging optical system;
   an evaluation value calculation section that calculates a focus evaluation value based on the captured image, the focus evaluation value being used to evaluate an in-focus state of an object in the captured image;
   a determination information calculation section that calculates determination information based on the focus evaluation value;
   a determination section that determines whether to start or stop an autofocus control process based on the determination information; and
   a focus control section that starts or stops the autofocus control process based on a determination result of the determination section;
   wherein:
   the evaluation value calculation section calculates a contrast value within a given area of the captured image as the focus evaluation value,
   the determination information calculation section calculates a change in contrast that indicates a temporal change in the contrast value as the determination information, and
   the focus control section starts the autofocus control process when it has been determined that the change in contrast satisfies a start condition, and stops the autofocus control process when it has been determined that the change in contrast satisfies a stop condition.

2. The focus control device as defined in claim 1, further comprising:

a second determination information calculation section that calculates second determination information based on luminance information about the captured image, wherein the determination section determines whether or not the change in contrast and the second determination information satisfy the start condition, and wherein the focus control section starts the autofocus control process when it has been determined that the change in contrast and the second determination information satisfy the start condition.

3. The focus control device as defined in claim 2, wherein the second determination information calculation section calculates a change in luminance as the second determination information, the change in luminance being a temporal change in average luminance within the given area of the captured image.

4. The focus control device as defined in claim 3, wherein the focus control section starts the autofocus control process when it has been determined that the start condition is satisfied, the start condition being a condition that the change in contrast is larger than a first threshold value, and the change in luminance is smaller than a second threshold value.

5. The focus control device as defined in claim 2, wherein the second determination information calculation section calculates information that indicates a luminance distribution of the captured image as the second determination information.

6. The focus control device as defined in claim 5, wherein:

the second determination information calculation section sets a first area that is a center area of the captured image, and second to nth areas that are obtained by dividing a peripheral area of the captured image, n being an integer corresponding to a total number of the areas including the first area and the areas obtained by dividing the peripheral area, and the second determination information calculation section calculates information that indicates a number of areas among the second to nth areas that have an average luminance higher than that of the first area as the information that indicates the luminance distribution, and the focus control section starts the autofocus control process when it has been determined that the start condition is satisfied, the start condition being a condition that the change in contrast is larger than the first threshold value and the number of areas that have an average luminance higher than that of the first area is smaller than a third threshold value.

7. The focus control device as defined in claim 2, wherein:

the determination section determines whether or not the change in contrast and the second determination information satisfy the stop condition, and the focus control section stops the autofocus control process when it has been determined that the change in contrast and the second determination information satisfy the stop condition.

8. The focus control device as defined in claim 7, wherein the second determination information calculation section calculates a change in luminance as the second determination information, the change in luminance being a temporal change in average luminance in the given area of the captured image.

9. The focus control device as defined in claim 8, wherein:

the focus control section starts the autofocus control process when it has been determined that the start condition is satisfied, the start condition being a condition that the change in contrast is larger than a first threshold value, and the change in luminance is smaller than a second threshold value, and the focus control section stops the autofocus control process when it has been determined that the stop condition is satisfied, the stop condition being a condition that the change in contrast is smaller than a fifth threshold value that is equal to or smaller than the first threshold value, and the change in luminance is larger than a sixth threshold value that is equal to or larger than the second threshold value.

10. The focus control device as defined in claim 7, wherein the second determination information calculation section calculates information that indicates a luminance distribution of the captured image as the second determination information.

11. The focus control device as defined in claim 10, wherein the second the determination information calculation section sets a first area that is a center area of the captured image, and second to nth areas that are obtained by dividing a peripheral area of the captured image, n being an integer corresponding to a total number of the areas including the first area and the areas obtained by dividing the peripheral area, and the second determination information calculation section calculates information that indicates a number of areas among the second to nth areas that have an average luminance higher than that of the first area as the information that indicates the luminance distribution, the focus control section starts the autofocus control process when it has been determined that the start condition is satisfied, the start condition being a condition that the change in contrast is larger than the first threshold value and the number of areas that have an average luminance higher than that of the first area is smaller than a third threshold value, and the focus control section stops the autofocus control process when it has been determined that the stop condition is satisfied, the stop condition being a condition that the change in contrast is smaller than a fifth threshold value that is equal to or smaller than the first threshold value, and the number of areas that have an average luminance higher than that of the first area is larger than a seventh threshold value that is equal to or larger than the third threshold value.

12. The focus control device as defined in claim 1, further comprising:

a light intensity control section that adjusts intensity of illumination light that illuminates the object so that the captured image is captured at correct exposure, wherein:

the light intensity control section outputs a light intensity control value that indicates the intensity of the illumination light, the determination section determines whether or not the change in contrast and the light intensity control value satisfy the start condition, and the focus control section starts the autofocus control process when it has been determined that the change in contrast and the light intensity control value satisfy the start condition.

13. The focus control device as defined in claim 12, wherein the focus control section starts the autofocus control process when it has been determined that the start condition is satisfied, the start condition being a condition that the change in contrast is larger than a first threshold value and the light intensity control value is smaller than a fourth threshold value.

14. The focus control device as defined in claim 12, wherein:

the determination section determines whether or not the change in contrast and the light intensity control value satisfy the stop condition, and the focus control section stops the autofocus operation when it has been determined that the change in contrast and the light intensity control value satisfy the stop condition.

15. The focus control device as defined in claim 14, wherein:

the focus control section starts the autofocus control process when it has been determined that the start condition is satisfied, the start condition being a condition that the change in contrast is larger than a first threshold value and the light intensity control value is smaller than a fourth threshold value, and the focus control section stops the autofocus control process when it has been determined that the stop condition is satisfied, the stop condition being a condition that the change in contrast is smaller than a fifth threshold value that is equal to or smaller than the first threshold value and the light intensity control value is larger than an eighth threshold value that is equal to or larger than the fourth threshold value.

16. The focus control device as defined in claim 1, wherein the focus control section suspends the autofocus control process when it has been determined that the object is in focus after the autofocus control process has been started.

17. The focus control device as defined in claim 16, wherein the focus control section resumes the autofocus control process when it has been determined that the start condition is satisfied after the autofocus control process has been suspended.

18. The focus control device as defined in claim 17, wherein:

the autofocus control process controls a single autofocus operation that focuses the imaging optical system on the object only once, and the focus control section performs the single autofocus operation when it has been determined that the start condition is satisfied, suspends the single autofocus operation until it is determined that the start condition is satisfied when it has been determined that the object is in focus during the single autofocus operation, and resumes the single autofocus operation when it has been determined that the start condition is satisfied.

19. The focus control device as defined in claim 1, wherein the focus control section performs the autofocus control process that controls a single autofocus operation, the single autofocus operation focusing the imaging optical system on the object only once.

20. The focus control device as defined in claim 1, wherein the focus control section performs the autofocus control process that controls a continuous autofocus operation, the continuous autofocus operation continuously focusing the imaging optical system on the object.

21. An endoscope apparatus comprising:
an imaging optical system; and
the focus control device as defined in claim 1.

22. A focus control device comprising:
an image acquisition section that acquires a captured image that has been captured by an imaging optical system;
an evaluation value calculation section that calculates a focus evaluation value based on the captured image, the focus evaluation value being used to evaluate an in-focus state of an object in the captured image;

a determination information calculation section that calculates determination information based on the focus evaluation value;

a determination section that determines whether or not to switch a focus control process between a fixed-focus control process and an autofocus control process based on the determination information, the fixed-focus control process setting an in-focus object plane of the imaging optical system at a preset in-focus object plane; and a focus control section that switches the focus control process between the fixed-focus control process and the autofocus control process based on a determination result of the determination section;

wherein:

the evaluation value calculation section calculates a contrast value within a given area of the captured image as the focus evaluation value, the determination information calculation section calculates a change in contrast that indicates a temporal change in the contrast value as the determination information, and the focus control section switches the focus control process to be the autofocus control process when it has been determined that the change in contrast satisfies a start condition, and stops the autofocus control process and switches the focus control process to be the fixed-focus control process when it has been determined that the change in contrast satisfies a stop condition.

23. An endoscope apparatus comprising:
an imaging optical system; and
the focus control device as defined in claim 22.

24. A focus control method comprising:
acquiring a captured image that has been captured by an imaging optical system;
calculating a focus evaluation value based on the captured image, the focus evaluation value being used to evaluate an in-focus state of an object in the captured image;
calculating determination information based on the focus evaluation value;
determining whether to start or stop an autofocus control process based on the determination information; and
starting or stopping the autofocus control process based on a result of the determination;
wherein:
a contrast value within a given area of the captured image is calculated as the focus evaluation value,
a change in contrast that indicates a temporal change in the contrast value is calculated as the determination information, and
the autofocus control process is started when it has been determined that the change in contrast satisfies a start condition, and the autofocus control process is stopped when it has been determined that the change in contrast satisfies a stop condition.

25. A focus control method comprising:
acquiring a captured image captured by an imaging optical system;
calculating a focus evaluation value based on the captured image, the focus evaluation value being used to evaluate an in-focus state of an object in the captured image;
calculating determination information based on the focus evaluation value;
determining whether or not to switch a focus control process between a fixed-focus control process and an autofocus control process based on the determination information, the fixed-focus control process setting an in-focus object plane of the imaging optical system at a preset in-focus object plane; and switching the focus control process between the fixed-focus control process and the autofocus control process based on a result of the determination;

wherein:

a contrast value within a given area of the captured image is calculated as the focus evaluation value, a change in contrast that indicates a temporal change in the contrast value is calculated as the determination information, and the focus control process is switched to be the autofocus control process when it has been determined that the change in contrast satisfies a start condition, and the autofocus control process is stopped and the focus control process is switched to be the fixed-focus control process when it has been determined that the change in contrast satisfies a stop condition.

* * * * *